(12) United States Patent
Suzuki et al.

(10) Patent No.: US 7,146,357 B2
(45) Date of Patent: Dec. 5, 2006

(54) DATABASE SYSTEM, SERVER, QUERY POSING METHOD, AND DATA UPDATING METHOD

(75) Inventors: Yoshio Suzuki, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 551 days.

(21) Appl. No.: 10/751,419

(22) Filed: Jan. 6, 2004

(65) Prior Publication Data

US 2004/0186829 A1 Sep. 23, 2004

(30) Foreign Application Priority Data

Mar. 17, 2003 (JP) .............................. 2003-071908

(51) Int. Cl.
*G06F 17/30* (2006.01)
(52) U.S. Cl. ...................... 707/3; 707/1; 707/2; 707/4; 707/5
(58) Field of Classification Search ...................... 707/3
See application file for complete search history.

(56) References Cited

U.S. PATENT DOCUMENTS

| | | | | |
|---|---|---|---|---|
| 5,301,317 | A * | 4/1994 | Lohman et al. | 707/2 |
| 5,761,653 | A * | 6/1998 | Schiefer et al. | 707/2 |
| 6,353,818 | B1 * | 3/2002 | Carino, Jr. | 707/2 |
| 2002/0128996 | A1 * | 9/2002 | Reed | 707/1 |
| 2003/0093408 | A1 * | 5/2003 | Brown et al. | 707/2 |
| 2004/0088561 | A1 * | 5/2004 | Dettinger et al. | 713/200 |

FOREIGN PATENT DOCUMENTS

JP   9-311795   5/1996

OTHER PUBLICATIONS

Cathan Cook, "Database Architecture: The Storage Engine", a database management system from Microsoft, http://msdn.microsoft.com/library/default.asp?url=/library/en-us/dnsql2k/html/thestorage engine.asp , Jul. 2001, 14 pages.

* cited by examiner

*Primary Examiner*—Don Wong
*Assistant Examiner*—Binh Van Ho
(74) *Attorney, Agent, or Firm*—Reed Smith LLP; Stanley P. Fisher, Esq.; Juan Carlos A. Marquez, Esq.

(57) ABSTRACT

An object of the present invention is to avoid contention for resources in a parallel/decentralized database system so as to improve the performance of the system. A query posing method is implemented in a database system comprising a plurality of database servers each of which includes a database from which the same content can be retrieved and searches the database in response to a query request a front-end server that poses a query according to a predetermined rule and a management server that manages rules to be used by the front-end server. The management server acquires a processed query log relevant to a database server, and produces a rule according to the compatibility value of a query calculated using the acquired processed query log. Moreover, the front-end server poses the query according to the rule produced by the management server.

17 Claims, 20 Drawing Sheets

| CONTENTS OF QUERY | PROCESSING TIME | START TIME INSTANT | END TIME INSTANT | USER NAME |
|---|---|---|---|---|
| select ... | 2200 | 19:05 22.02 | 19:05 24.22 | Scott |
| select ... | 1500 | 19:05 25.00 | 19:05 26.50 | John |
|  |  |  |  |  |
|  |  |  |  |  |

FIG. 5A
EXAMPLE OF GROUPING 1

| # | TEMPLATE | CONTENTS OF QUERY |
|---|---|---|
| 1 | A | select a from A where b > 2 |
|   |   | select a, b from A |
| 2 | B | select a from B where c > 3 |
|   |   | select a, c from B where b > 3 |

FIG. 5B
EXAMPLE OF GROUPING 2

| # | TEMPLATE | CONTENTS OF QUERY |
|---|---|---|
| 1 | {a}, {A} | select a from A where b > 2 |
|   |   | select a from A |
| 2 | {a, c}, {A} | select a, c from A where c > 3 |
|   |   | select a, c from A where d > 3 |

FIG. 5C
EXAMPLE OF GROUPING 3

| # | TEMPLATE | CONTENTS OF QUERY |
|---|---|---|
| 1 | {a}, {A}, {b} | select a from A where b > 2 |
|   |   | select a from A where b > 30 |
| 2 | {a}, {A}, {c} | select a from A where c > 3 |
|   |   | select a from A where c > 5 |

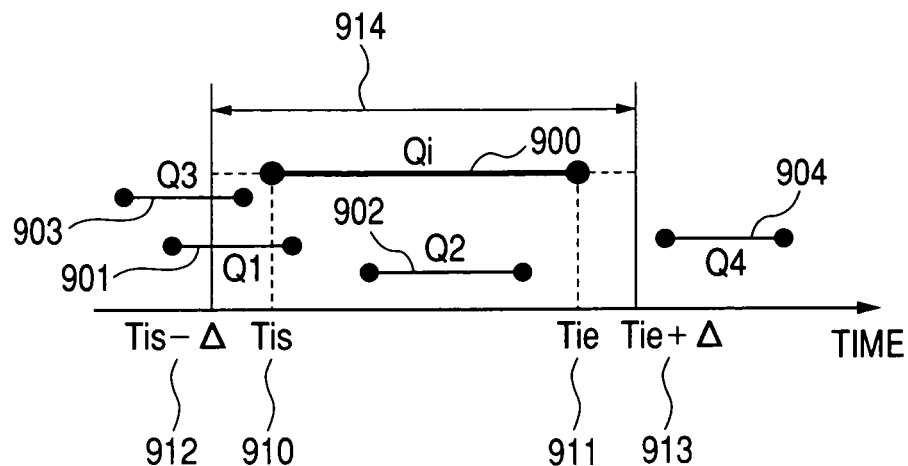

PRODUCING RULE FOR COMPATIBILITY BETWEEN QUERIES

PRODUCING RULE FOR COMPATIBILITY BETWEEN QUERY AND SERVER

FIG. 10A

RULE LIST 1
(RULE FOR COMPATIBILITY BETWEEN QUERIES)

| CONDITION | COMPATIBILITY VALUE | FREQUENCY |
|---|---|---|
| Q1, Q2 | 20 | 0 |
| Q1, Q7 | 10 | 0 |
| ... | ... | ... |

FIG. 10B

RULE LIST 2
(RULE FOR COMPATIBILITY BETWEEN QUERIES)

| CONDITION | COMPATIBILITY VALUE | FREQUENCY |
|---|---|---|
| Q1, S2 | 20 | 0 |
| Q1, S4 | −10 | 0 |
| ... | ... | ... |

FIG. 11A
COMPATIBILITY MATRIX

FIG. 11B
CALL MATRIX

REPLICA 1

REPLICA 2

REPLICA 3

FIG. 15A
CORRELATION MATRIX

| | U1 | U2 | ... | Uj | ... | Un | |
|---|---|---|---|---|---|---|---|
| U1 | | | | | | | A1 |
| ... | | | | | | | ... |
| Ui | | | | Cij | | | Ai |
| ... | | | | | | | ... |
| ... | | | | | | | |
| Un | | | | | | | An |

FIG. 15B
CALL MATRIX

| | U1 | U2 | ... | Uj | ... | Un | |
|---|---|---|---|---|---|---|---|
| U1 | | | | | | | T1 |
| ... | | | | | | | ... |
| Ui | | | | Tij | | | Ti |
| ... | | | | | | | ... |
| ... | | | | | | | |
| Un | | | | | | | Tn |

FIG. 15C
RULE LIST 3
(RULE FOR COMPATIBILITY BETWEEN USERS)

| CONDITION | COMPATIBILITY VALUE | FREQUENCY |
|---|---|---|
| U1, U2 | 20 | 0 |
| U1, U4 | −10 | 0 |
| ... | ... | ... |

DATABASE SYSTEM, SERVER, QUERY POSING METHOD, AND DATA UPDATING METHOD

PRIORITY CLAIM

This application claims priority under 35 U.S.C. §119 to Japanese patent application P2003 071908 filed Mar. 17, 2003, the entire disclosure of which is hereby incorporated herein by reference.

FIELD OF THE INVENTION

The present invention relates to a retrieval system comprising a plurality of database servers which process queries and a front-end server that poses a query received externally to a database server.

BACKGROUND OF THE INVENTION

In recent years, parallel operation and decentralization of databases have been encouraged for the purpose of improvement in performance or reliability. FIG. 22 shows a typical example of a configuration of a conventional database system.

The performance of the conventional database system in searching a database is improved by creating a plurality of replica databases 104 relative to one master database 103. A front-end server 102 decentralizes queries and poses them to the replica databases 104. Otherwise, one database may be regarded as a use database and the other may be regarded as a standby database. The databases may be switched in case of a fault. Reliability may thus be improved.

In the past, as a method for decentralizing queries and posing them to a plurality of servers, a method of determining a server, to which a query is assigned, according to the round robin or a method of measuring a load such as a CPU use rate and assigning a query to a server that incurs a light load has been adopted.

For example, the number of resources used by each batch job is calculated. When a plurality of jobs must be performed, a sum total of resources is calculated. If the sum total of resources exceeds the number of resources permitted by a server, no new job is submitted in order to avoid contention for resources. This method of scheduling batch jobs has been proposed (refer to, for example, Patent Document 1, JP-A No. 311795/1997).

In order to further improve the performance of the database system, it is important to avoid contention for resources such as contention for a database buffer or a disk among the replica databases 104.

Contention for a database buffer (cache) will be described in conjunction with FIG. 23 and FIG. 24 below. A disk 201 is connected to a server 200, and three tables (205, 206, and 207) are stored in the disk 201. When a query 1 (220) for requesting data in table 1 (205) is posed to the server 200, required data is transmitted from table 1 (205) in the disk 201 in response to the query.

Inputting or outputting data to or from a disk (disk inputting/outputting) requires more processing time than reading or writing data to or from a memory. A memory is therefore adopted as a cache for inputting or outputting data to or from a disk. The cache (database buffer) is a portion of a memory 203, and divided into data pages 204 having a storage capacity of several kilobytes. The data pages 204 are organized according to the least recently used (LRU) algorithm. Data used frequently is left in the memory 203.

If a query 1 (220) for data of table 1 (205) is issued, the database buffer is searched. If the required data of table 1 (205) is stored in the database buffer in the memory 203, a result can be obtained without the necessity of disk inputting/outputting.

On the other hand, as shown in FIG. 24A, if a query 2 (221) for data of table 2 (206) is posed to the server 200, since required data is not stored in a memory 300, disk inputting/outputting is performed. As shown in FIG. 24B, a portion of the memory 301 is overwritten with the data of table 2 (206), that is, a queried content.

For example, assume that two queries for requesting large results whose contents are different from each other are continuously processed. In this case, the database buffer in the memory 300 is overwritten in response to the queries. Every time a query is processed, disk inputting/outputting takes place. In contrast, when queries request a common content, the possibility that data stored in a cache (database buffer) may be usable is high. The result can be obtained with little disk inputting/outputting. Thus, queries have compatibility. The performance of a database system varies depending on the order of posing queries.

Methods for avoiding contention for a database buffer (cache) include a method according to which a plurality of queries that requests the same data shares the same database buffer. For example, assume that two different queries request the same data, and the data is larger than the storage capacity of a database buffer. In this case, when the first half of data has been read in response to the first query, if the second query (query 2) is issued, the first half of data may have already been deleted from the database buffer. In other words, if data requested with a query is large, the first half of data may be overwritten with the second half thereof being read in response to the first query (query 1).

In this case, the first half of data is reread from a disk in response to the query 2, and the database buffer is overwritten with the read data. However, the data overwritten with the read data (second half of data read in response to the query 1) is data also requested with the query 2. Unnecessary disk inputting/outputting takes place. In order to cope with this problem, a method of reading data not from the beginning but from the same point as the point, from which reading is started in response to the query 1, during the second reading, while using the buffer in common between the queries 1 and 2 has been implemented in the SQL server that is a database management product from Microsoft Corp. (refer to, for example, Non-patent Document 1, http://msdn.microsoft.com/library/default.asp?url=/library/en-us/dnsql2k/html/thestorageengine.asp).

Methods for effectively utilizing other buffer include a method of dividing a cache into fields and associating the fields with the levels of importance of data. An Oracle that is a database product from Oracle Corp. divides a buffer into three fields of keep, default, and recycle fields, and allows a user to designate a size or a management method for each field. For example, data that must reside in a buffer is stored in the keep field, data that may be overwritten is stored in the recycle field, and the other data is stored in the default field. Thus, the buffer is divided into fields. For data allocation, the property of data must be well understood. A setting must be modified every time a data size or a system configuration is changed.

In a decentralized/parallel computer environment, an increase in the cost of operation as well as performance poses a critical problem. If the number of computers to be managed increases, the cost of operation increases.

In business employing an information technology (IT) system, a system failure leads to a great loss. It is therefore essential that the system should be operated on a stable basis. For example, in order to avoid a system failure derived from concentration of accesses on the system, servers are added according to the number of accesses.

In an environment in which a configuration or setting is changed frequently, it is not easy to manage things according to the change. Every time the environment changes, if each computer is manually tuned or an environmental setting is manually optimized, the costs of operation and management increases. Methods of lowering, the costs of operation and management include automatic tuning. The SQL server from Microsoft Corp. and other products permit automatic tuning of parameters representing the settings of each database. However, the automatic tuning does not fully cope with the parallel/decentralized environment.

Other methods of lowering the cost of operation include a method of consigning the whole or part of operation and management to an outside management service provider (MSP) who contracts to manage an IT system. For example, a monitoring service provided by such an MSP includes monitoring of performance information such as a CPU use rate of a server, and sounding of an alarm if a predetermined threshold is exceeded.

SUMMARY OF THE INVENTION

A query posed to a database system has compatibility with other query or a server. However, contention for resources takes place between a pair that is incompatible with each other. For example, if contention for a database buffer occurs, disk inputting/outputting that is slower than memory reading/writing takes place. This is a critical problem in terms of performance.

As far as a database unit is concerned, an automatic tuning technology has been developed. However, the technology does not optimize-an entire system in a parallel/decentralized environment.

Methods for decentralizing queries into a plurality of servers include a method of selecting a server according to the round robin and a method of selecting a server that incurs a light load. The methods do not take account of the compatibility between queries or between a query and a server. There is therefore the possibility that contention for resources may occur during query processing. Therefore there is a need to perform scheduling appropriately in consideration of the compatibility between queries or between a query and a server for the purpose of avoiding contention for resources and to thus improve the throughput of an entire system.

When the parallel operation or decentralization of servers advances, the number of servers to be managed increases. Consequently, it becomes hard to finely tune the settings of the servers, and costs high. Moreover, it is not easy to manage the servers independently and totally as a whole. In a parallel/decentralized environment, there is the necessity of autonomously learning a scheduling method and managing an entire system at a low cost.

Thus the present invention may comprise: a plurality of database servers each of which includes a database from which the same content can be retrieved and searches the database in response to a query request; a front-end server that receives the query request and poses a query to any of the database servers according to a predetermined rule; a management server that manages rules to be used by the front-end server; and a network over which the servers and client terminals that issue a query are interconnected. The management server comprises: a log acquiring means for acquiring a processed query log relevant to each database server; and a rule production unit or means for producing a rule according to the compatibility value of a query calculated using the acquired log. The front-end server includes a query posing means that poses the query according to the rule produced by the management server.

The present invention may also provide a query posing method implemented in a database system comprising: a plurality of database servers each of which includes a database from which the same content can be retrieved and searches the database according to a query request; a front-end server that receives the query request and poses a query to any of the database servers according to predetermined rules; a management server that manages rules to be used by the front-end server; and a network over which the servers and client terminals that issue a query are interconnected. The management server acquires a processed query log relevant to a database server, and produces a rule according to the compatibility value of a query calculated using the acquired log. The front-end server poses the query according to the rule produced by the management server. Specifically, the front-end server has a queue and a scheduler. The front-end server judges the compatibility between queries or between a query and a database server. The scheduler poses a query that is mated with a compatible query or database server. The scheduling is performed based on the rule in order to avoid contention for resources. Consequently, the performance of the database system can be improved.

Moreover, the management server acquires a processed query log relevant to a database server, statistically analyzes the acquired processed query log, and calculates the compatibility value between queries or between a query and a database server. The management server then produces a rule according to the calculated compatibility value, and transmits the rule to the front-end server. The rule is produced based on the processed query log. Even when any feature of an environment or a query changes, the front-end server can autonomously learn the rule.

BRIEF DESCRIPTION OF THE DRAWINGS

FIG. 5A to FIG. 5C are explanatory diagrams concerning grouping of queries performed according to the first embodiment of the present invention;

FIG. 6 is an explanatory diagram concerning query processing to be performed according to the first embodiment of the present invention;

FIG. 7A and FIG. 7B are explanatory diagrams showing a compatibility matrix employed in compatibility calculation according to the first embodiment of the present invention;

FIG. 10A and FIG. 10B show the structures of rule lists employed according to the first embodiment of the present invention;

FIG. 11A and FIG. 11B are explanatory diagrams showing other compatibility matrixes employed in compatibility calculation according to the first embodiment of the present invention;

FIG. 15A to FIG. 15C are explanatory diagrams showing a compatibility matrix concerning the compatibility between users which is employed in compatibility calculation according to a second embodiment of the present invention;

DETAILED DESCRIPTION OF THE PREFERRED EMBODIMENTS

Figure 1:
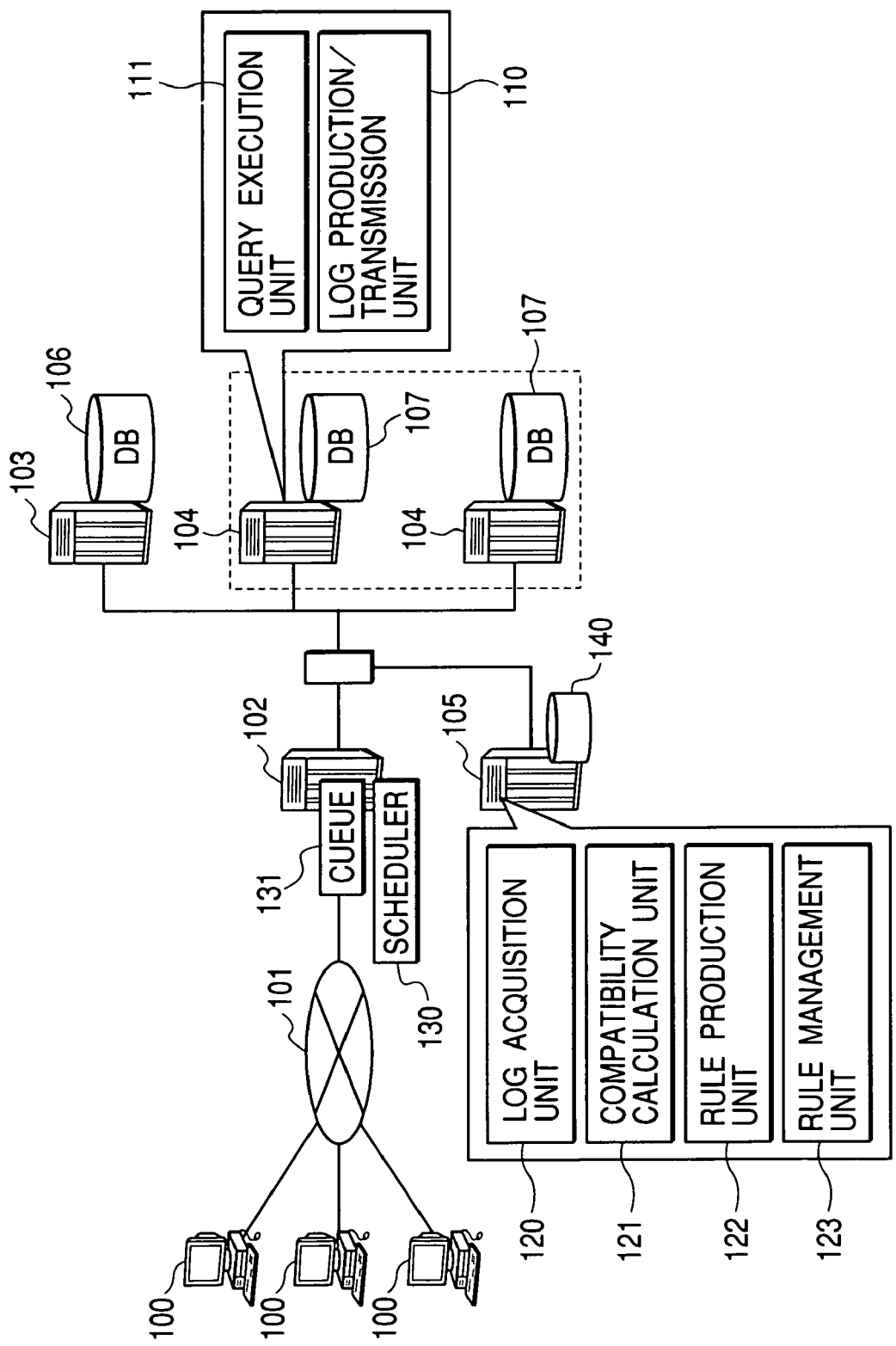
FIG. 1 shows the configuration of a database system in accordance with a first embodiment of the present invention.

FIG. 1 shows the configuration of a database system in accordance with a first embodiment of the present invention.

Clients 100 issue a query to a database over a network 101 (intranet or Internet®).

The database includes a database server (front-end) 102 and a plurality of back-end database servers 103 and 104. The front-end 102 receives a query and poses (or dispatches) the query to the back-end database servers 103 and 104.

The back-end database servers include a master database server (master) 103 and a plurality of replica database servers (replicas) 104. The master 103 includes a storage device 106, and the replicas 104 include a storage device 107. The same contents as the contents of the storage device 106 connected to the master 103 are stored in the storage devices 107 connected to the replicas 104. Normally, the master 103 updates or retrieves the stored contents, while the replicas 104 perform retrieval alone. The replicas 104 regularly replicate the contents of the storage device 106 connected to the master 103 so as to reflect a change in the contents of the storage device 106 on the storage devices 107 connected to the replicas 104.

Each of the replicas 104 includes a query processing unit 111 and a log recording/transmitting unit 110. The query processing unit 111 processes a query transmitted by the front-end 102. The log recording/transmitting unit 110 records a log of processed queries (type of query, a processing time, etc.) and transmits the log to the management server 105.

The management server 105 includes a log acquisition unit 120, a compatibility calculation unit 121, a rule production unit 122, and a rule management unit 123. The management server 105 includes a rule database 140.

The log acquisition unit 120 receives the processed query log from the replica 104 and thus acquires the processed query log from the replica 104.

The compatibility calculation unit 121 analyzes the processed query log acquired by the log acquisition unit 120, and calculates as the compatibility of a query the compatibility between queries or between a query and the replica 104. A compatibility value is calculated relative to the attributes of queries listed in the processed query log, relative to an attribute of a query and a replica, or relative to users who have issued a query.

The rule production unit 122 produces a rule, based on which a query is scheduled, according to the calculated compatibility. For example, when a query A and a query B are compatible with each other, a rule that the queries should be posed to the same replica 104 is produced. The produced rule is transmitted to the front-end 102.

The rule management unit 123 stores in the rule database 140 the rule produced by the rule production unit 122 and the frequency by which the rule has been applied and which is recorded by the front-end 102. Moreover, the performance information of hardware and software constituting each replica 104 (for example, a resource use rate such as a CPU use rate or a memory use rate) can be stored in the rule database 140. The information concerning the rule and the rule application frequency allows a manager to learn what rule is actually employed.

The front-end 102 has a queue 131 and a scheduler 130. A query the front-end 102 has received is placed in the queue 131 and scheduled by the scheduler 130. Thus, queries 104 are allocated and posed.

The scheduler 130 schedules a query according to the rule produced by the management server 105, and determines the replica 104 to which the query is posed. When a query is posed to the replica 104, a frequency by which a rule has been applied is recorded. The information concerning the rule application frequency is transmitted to the management server 105.

The replica 104 processes a query. Based on the query processed by the replica 104, the management server 105 calculates a compatibility value and produces a rule. Based on the rule produced by the management server 105, the front-end 102 poses a query to the replica 104. The replica 104 then processes the query.

The foregoing cycle is repeated, whereby rules for scheduling can be autonomously produced based on a change in a system configuration (for example, addition of a server or an increase in a data size) or a change in an input (for example, an increase in an input load or a change in the contents of a query). Using the produced rules for scheduling, the front-end 102 poses a query which is mated with a query or a server so that contention for resources can be avoided. Thus, improvement in the performance of the entire database system can be achieved at a low cost.

Next, actions to be performed by the replica 104, management server 105, and front-end 102 will be described below.

Figures 2, 3:
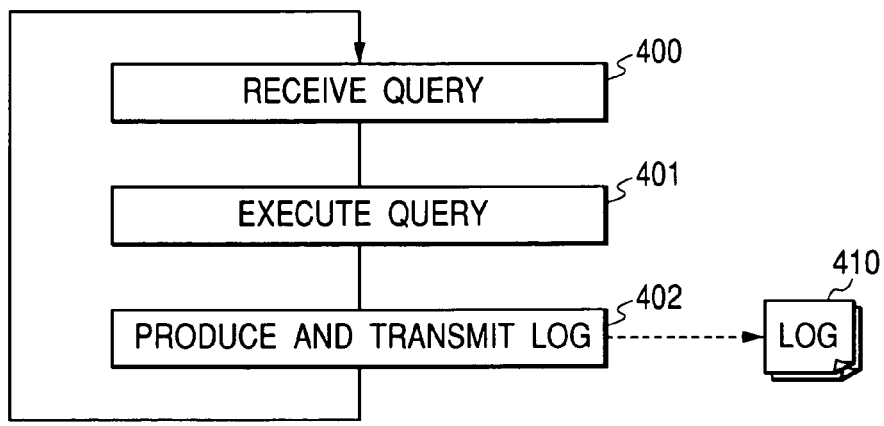
FIG. 2 is a flowchart describing actions to be performed by a replica 104 included in the first embodiment of the present invention.
FIG. 3 shows the structure of log data recorded in the replica 104 included in the first embodiment of the present invention.

FIG. 2 is a flowchart describing actions to be performed by a database server (replica 104) included in the first embodiment of the present invention.

First, a query issued from the client 100 is received (step 400). The received query is then processed (step 401). A processed query log 410 is recorded (step 402), and transmitted to the management server 105. The next query is then received (step 400).

The processed query log 410 may be transmitted in real time in units of a query. For example, an event may be transmitted with every query processing. An entity that acquires the processed query log (management server 105) acquires the event to record the processed query log (for example, the SQL server 2000 from Microsoft Corp.). Moreover, a plurality of processed query logs 410 each listing processed queries may be transmitted at a time. For example, the processed query logs 410 may be recorded and preserved in the replicas 104 for a certain period of time, and then transferred to the management server 105 in batch mode at an appropriate timing.

The processed query log 410 is transmitted in the format shown in FIG. 3. Namely, the attributes of each query such as the contents of a query (SQL statement or a stored procedure) 700, a processing time 702, a start time instant 702, an end time instant 703, and a user name 704 are recorded in the processed query log 410.

Moreover, in addition to the processed query log 410, a resource use rate at which hardware or software is used, or any other performance information may be transmitted to the management server 105. For example, a CPU use rate or a memory use rate at which the replica 104 uses a CPU or memory is conceivable. The performance information is not essential to compatibility calculation. However, if the performance information is managed as time-sequential data, it will be helpful in monitoring or analyzing the performance of the replica 104.

Figure 4:
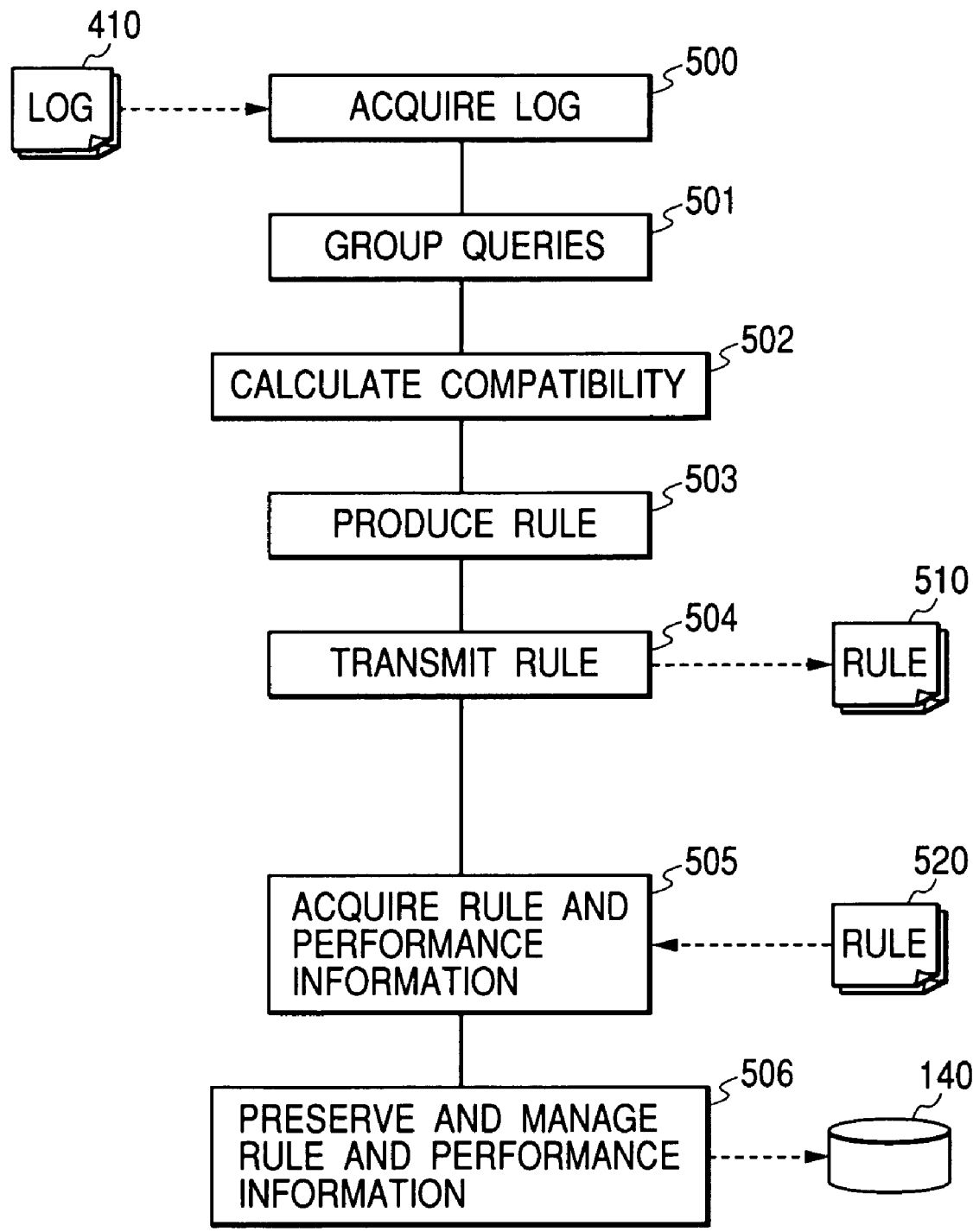
FIG. 4 is a flowchart describing actions to be performed by a management server 105 included in the first embodiment of the present invention.

FIG. 4 is a flowchart describing actions to be performed by the management server 104 included in the first embodiment of the present invention.

The processed query log 410 is acquired from the replica 104 (step 500).

Grouping of queries is performed as pre-processing of compatibility calculation (step 501). The compatibility calculation is not performed for each query but must be performed for each of groups into which a plurality of queries is classified by pattern. If the compatibility calculation is performed for each query, the same number of rules as the number of queries is produced. In this case, since each rule is applied to identical queries alone, the usability of a rule is lowered. Besides, if the compatibility calculation is performed for each query, the number of compatible pairs increases. This leads to an increase in a processing load.

After grouping of queries is completed, a compatibility value is calculated for each group of queries (step 502). A rule is produced based on the result of compatibility calculation (step 503). Finally, the produced rule 510 is transmitted to the front-end 102 (step 504).

The front-end 102 schedules a query according to the received rule, and feeds back the rule and the application frequency, by which the rule is applied, to the management server 105 at an appropriate timing (at intervals of a predetermined time or in response to a request from the management server 105).

The management server 105 receives the rule and the rule application frequency (step 505), and preserves the received information in the rule database 140 (step 506).

FIG. 5 is an explanatory diagram concerning grouping of queries performed according to the first embodiment of the present invention (step 501).

Hereinafter, grouping will be described using a simple query written in the SQL language, that is, "select a from A where b>3." Herein, A described as an argument for the from clause denotes a table name. A table has a plurality of rows, and each row has a plurality of columns. An argument for the where clause, specifies a column name as a search condition. In this case, the where clause specifies the condition that b of the column b in table A denotes a numerical value larger than 3. A column name is specified with an argument for the select clause (in this case, column a is specified).

In example 1 of grouping shown in FIG. 5A, queries are grouped by a table name employed. Queries that specify use of the same table as a search condition are grouped together. Queries 1011 and 1012 that specify use of table A are classified into the same group. Queries 1013 and 1014 that specify use of table B are classified into the same group.

In example 2 of grouping shown in FIG. 5B, queries are grouped by a table name and an acquired column name. Queries that specify use of the same table as a search condition and the same column name as a result of retrieval are grouped together. Queries 1021 and 1022 that specify acquisition of column a in table A are classified into the same group. Queries 1023 and 1024 that specify acquisition of columns a and c in table A are classified into the same group. At this time, the search condition may be different.

In example 3 of grouping shown in FIG. 5C, queries are grouped by an acquired column name and a retrieval condition. Queries that are identical to one another except a constant value contained in a search condition are grouped together. When a retrieval condition is specified using column b in table A, queries 1031 and 1032 that specify acquisition of column a in table A are classified into the same group. When a retrieval condition is specified using column c in table A, queries 1033 and 1034 that specify acquisition of column a in table A are classified into the same group.

Finer grouping can be achieved in the order of FIG. 5A, FIG. 5B, and FIG. 5C. However, an amount of data to be processed for grouping also increases.

Next, compatibility calculation (step 502) will be described below.

Now, a degree of improvement in a processing time that is a difference between a processing time required to process two queries concurrently and a processing time required to process a query independently will be discussed as compatibility. For example, assume that two queries specify use of the same table in a retrieval condition and the same database buffer can be shared by processing of the queries. In this case, when the two queries are processed concurrently or continuously, a processing time can be shortened. Therefore, the queries are thought to be compatible with each other. In contrast, when the same database buffer cannot be shared by processing of queries, the queries are incompatible with each other because disk inputting/outputting is needed.

FIG. 6 is an explanatory diagram concerning states of queries processed according to the first embodiment of the present invention.

In the example shown in FIG. 6, query Q2 (902) is processed at the same time as query Qi (900). Moreover, a processing time for query Q1 (901) overlaps a processing time for query Qi (900).

According to the present embodiment, query Qj whose processing overlaps processing of query Qi (900) is retrieved. This retrieval refers to retrieval of query Qj which meets the conditions that the value of the end time instant of query Qj should be larger than the value of the start time instant of query Qi (900) and the value of the start time instant of query Qj should be smaller than the value of the end time instant of query Qi (900). In the example shown in FIG. 6, query Q1 (901) and query Q2 (902) meet the conditions.

Not only queries whose processing overlaps processing of query Qi but also queries whose processing time overlaps a time (914) calculated by adding a tolerance Δ to the start and end of the processing time for query Qi may be retrieved. This retrieval refers to retrieval of query Qj which meets the conditions that the value of the end time instant of query Qj should be larger than a difference of a tolerance Δ (912) from the value of the start time instant of query Qi (900) and that the value of the start time instant of query Qj should be smaller than a sum between the value of the end time instant of query Qi (900) and a tolerance Δ (913). When queries are retrieved using the tolerance Δ, queries processed concurrently as well as queries processed immediately before and after query Qi are included in queries to be retrieved. In the example shown in FIG. 6, queries Q1 (901) and Q2 (902) as well as query Q3 (903) meets the conditions.

FIG. 7A and FIG. 7B are explanatory diagrams showing a compatibility matrix employed in compatibility calculation according to the first embodiment of the present invention.

Compatibility calculation is performed using a compatibility matrix that lists values of compatibility among queries. For example, Cij (803) in the compatibility matrix 800 denotes the sum of processing times required to process query Qi (801) concurrently with query Qj (802), and represents the compatibility value between query Qi (801) and query Qj (802). On the other hand, Ai (804) denotes the sum of processing times required to process query Qi (801) in combination with all queries Qj (802).

A call matrix 810 indicates how many queries are used to calculate a compatibility value. For example, Tij (813) denotes how many queries are used to calculate Cij (803) (a frequency by which query Qi (801) is retrieved from a processed query log concurrently with query Qj (802)). Ti (814) denotes the number of queries used to calculate Ai (804) (a frequency by which query Qi (801) listed in a processed query log is processed).

Figure 8:
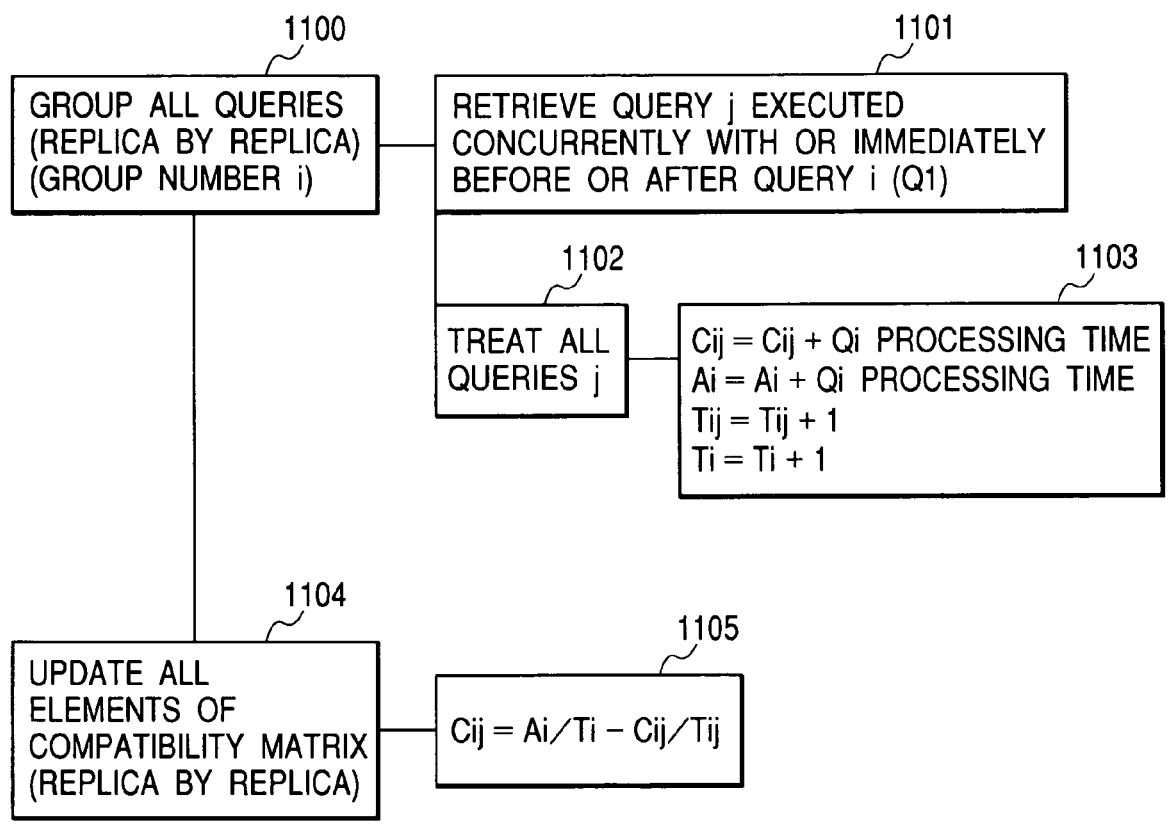
FIG. 8 is a flowchart describing compatibility calculation (step 502) to be performed according to the first embodiment of the present invention.

FIG. 8 is a flowchart describing compatibility calculation (step 502) performed according to the first embodiment of the present invention. The compatibility calculation is performed for each log recorded in each replica 104.

To begin with, a query to be processed concurrently with query Qi (900) is retrieved (step 1101). The retrieval is performed according to, for example, the method explained in conjunction with FIG. 6.

The calculations of expressions (1) to (3) below are performed on all queries Qj that meet the retrieval conditions, whereby the associated values in the compatibility matrix 800 and call matrix 810 are updated (steps 1102 and 1103).

$$Cij = Cij + \text{Query } Qi \text{ processing time} \quad (1)$$

$$Ai = Ai + \text{Query } Qi \text{ processing time} \quad (2)$$

$$Tij = Tij + 1 \quad (3)$$

Finally, all the elements of the compatibility matrix 800 are updated according to expression (4) below (steps 1104 and 1105).

$$Cij = Ai/Ti - Cij/Tij \quad (4)$$

The right side of the expression (4) corresponds to (Average of query Qi (801) processing times—Average of times required to process query Qi (801) concurrently with queries Qj (802)). Namely, a degree of improvement in performance to be achieved by processing query Qi (801) concurrently with queries Qj (802) is worked out. The value serves as the compatibility value between query Qi (801) and query Qj (802).

Next, rule production (step 503) will be described below.

During rule production (step 503), a rule is produced based on attributes recorded in the processed query log 410 or the compatibility value with a server. For example, the compatibility between queries, between a query and a server, or between a user and a server is taken into consideration in order to produce a rule. Herein, a description will be made of production of a rule for the compatibility between queries or between a query and a server.

Figure 9A:
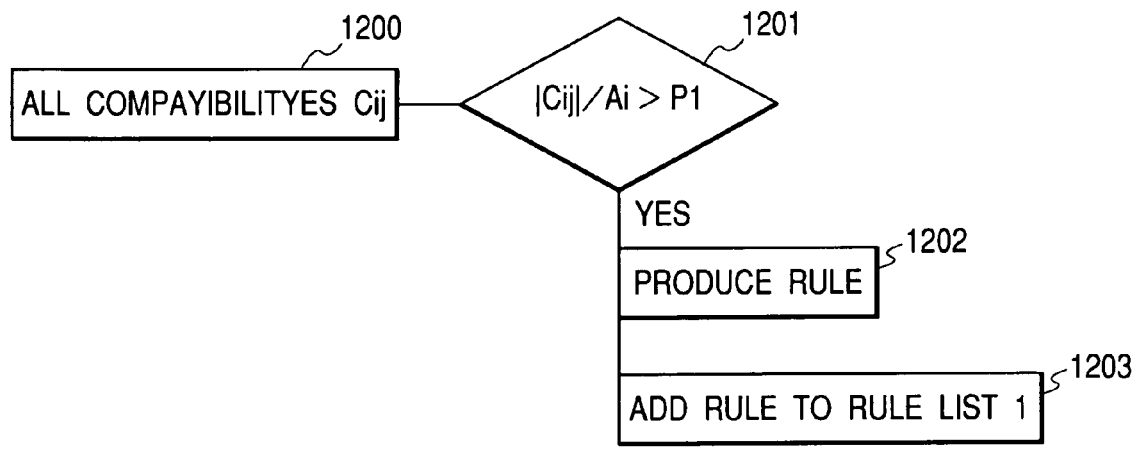
FIG. 9 is a flowchart describing production of a rule for queries (step 503) to be performed according to the first embodiment of the present invention.

FIG. 9A is a flowchart describing production of a rule for the compatibility between queries (step 503) performed according to the first embodiment of the present invention.

Calculations of the elements of the compatibility matrix 800 and call matrix 810 relevant to each replica 104 have been completed. Moreover, the calculation shown in FIG. 9A is performed for each processed query log 410 recorded in each replica 104.

First, it is verified whether all Cij values are used to produce a rule, and Cij values to be used to produce a rule are detected (step 1201). Specifically, a quotient of an absolute Cij value by an Ai value is compared with a predetermined constant. Based on the result of the comparison (whether the quotient is larger than the predetermined constant P1 ($0 \leq P1 < 1$)), it is verified whether the Cij value is used to produce a rule. Through the verification based on the condition, Cij values that little affect the performance of the database system are unused to produce a rule. Cij values that greatly affect the performance are used to produce a rule irrespective of whether relevant queries Qi and Qj are compatible or incompatible each other. Incidentally, when P1 equals 0, all Cij values are used to produce a rule.

If the quotient of an absolute Cij value by an Ai value, that is, |Cij|/Ai is larger than the constant P1, the Cij value is used to produce a rule (step 1202), and the rule is added to a rule list 1 (step 1203).

FIG. 10A shows the rule list 1 (1910). In the rule list 1 (1910), a rule comprises a condition 1911 indicating a pair of queries, a compatibility value 1912, and a frequency 1913. The frequency 1913 is a frequency by which the rule has been applied and which is designated by the front-end 102. The initial value of the frequency 1913 is 0.

The rule list 1 (1910) comprises a plurality of rules that satisfy a condition 1201. Namely, when it says that a rule is produced, it means that the condition 1911 indicating the pair of queries Qi and Qj concerning a Cij value, the compatibility value 1912, and the frequency 1913 (initial value=0) are added to the rule list 1.

Figure 9B:
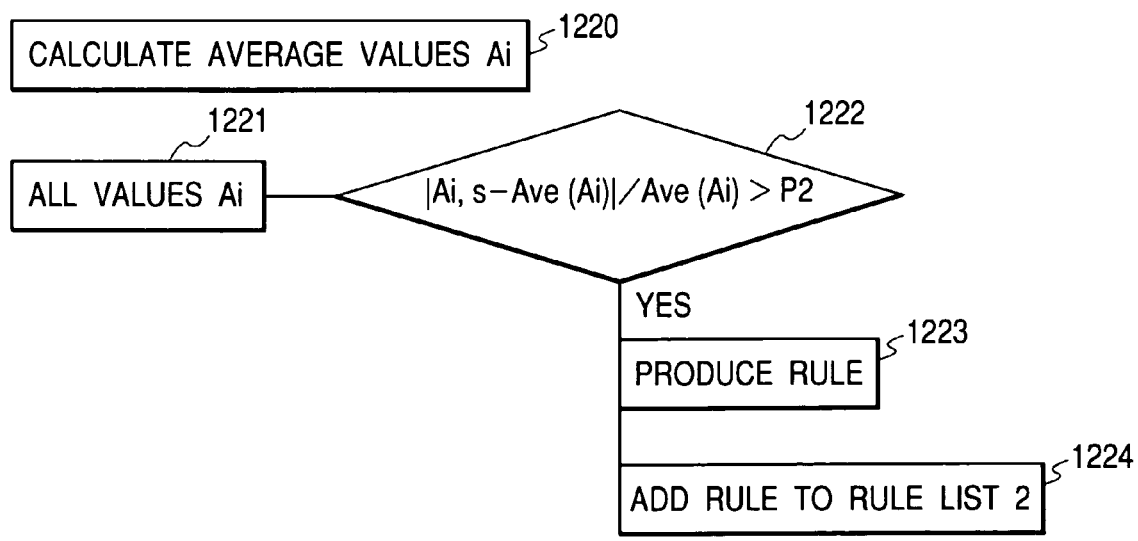

FIG. 9B is a flowchart describing production of a rule for the compatibility between a query and a server (step 503).

First, at step 1220, an average Ave(Ai,s) of average processing times Ai,s for queries Qi calculated relative to each server is calculated (where s denotes a server name) It is verified whether all the average processing times Ai,s satisfy a condition 1222, that is, whether an improvement rate expressed using the average processing time, |Ai,s−Ave(Ai,s)|/Ave(Ai,s), is larger than a predetermined constant P2 ($0 \leq P2 < 1$). Through the verification based on the condition, average processing times Ai,s that little affect the performance of the database system are unused to produce a rule. In other words, average processing times Ai,s that greatly affect the performance are used to produce a rule irrespective of whether each of the relevant queries Qi and the server are compatible or incompatible with each other. Incidentally, when the constant P2 equals 0, all the average processing times Ai,s are used to produce a rule.

When |Ai,s−Ave(Ai,s)|/Ave(Ai,s) is larger than the constant P2, a rule is produced (step 1223) and recorded in the rule list 2 (step 1224).

FIG. 10B shows the rule list 2 (1930). In the rule list 2 (1930), a rule comprises a condition 1931 indicating a pair of a query and a server, a compatibility value (Ave (Ai,s)−Ai,s) 1932, and a frequency 1399. The frequency 1934 is a frequency by which the rule has been applied and which is designated by the front-end 102. The initial value of the frequency is 0.

The rule list 2 (1930) comprises a plurality of rules that satisfies the condition 1222. Namely, when it says that a rule is produced, it means that the condition 1931 indicating the pair of a query Qi and a server s, the compatibility value 1932 represented by a value (Ave(Ai,s)−Ai,s), and the frequency 1933 (initial value=0) are added to the rule list 2.

FIG. 11A is an explanatory diagram showing a compatibility matrix used to calculate a compatibility value between a query and a server (replica 104) according to the first embodiment of the present invention.

A compatibility matrix 800 and a call matrix 810 shown in FIG. 11 are included in each replica 104. In the compatibility matrix 800, Aim (804) denotes the sum of processing times required to process a query Qi (801) in combination with all queries Qj (802). In the call matrix 810, Tim (814) denotes the number of queries used to calculate an Ai value (804) (frequency by which the query Qi (801) is retrieved from a log and processed).

A query Qi (801) is posed to replicas m, and Aim values (804) are calculated and compared with one another. A replica that provides a minimum Aim value is regarded as a replica that is most suitable for processing the query Qi. Thus, the compatibility between a replica and a query is verified.

Figure 12:
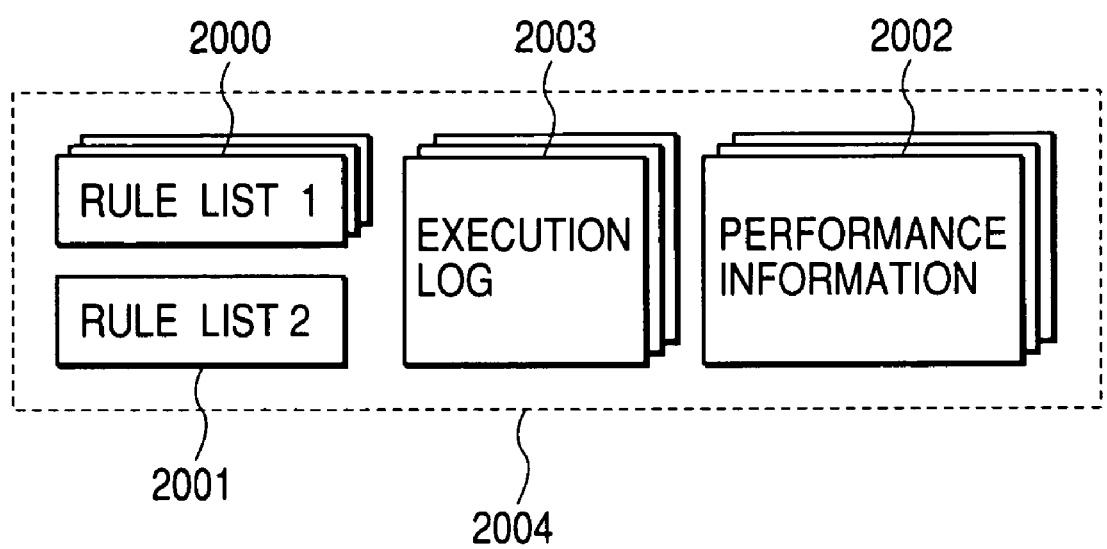
FIG. 12 is an explanatory diagram showing a data file which the management server 105 included in the first embodiment of the present invention manages using a rule database 140.

FIG. 12 is an explanatory diagram showing a data file which the management server 105 included in the first embodiment of the present invention manages using the rule database 140.

A data file 204 contains rule lists 2000 and 2001, processed query logs 2003, and performance information items 2002. The rule lists include rule lists 1 (2000) that list compatibility values among queries, and a rule list 2 (2001) that lists compatibility values among queries and servers. The numbers of rule lists 1 (2000), processed query logs 2003, and performance information items 2002 are the same as the number of replicas 104.

The processed query log 2003 is a record of performance information concerning queries processed by the replicas 104 and preserved in the format described in conjunction with FIG. 3. Based on the processed query log 2003, the rule lists 2000 and 2001 are produced.

The performance information 2004 is time-sequential data concerning of the performance of hardware and software of the replicas 104. For example, a CPU use rate, a memory use rate, or the like is recorded as the performance information 2004.

The data file 2004 may contain latest data alone. Otherwise, every time data is changed, new data may be recorded in the data file 2004 so that the data file 2004 will contain time-sequential data.

Next, actions to be performed by the front-end 102 will be described below.

Figure 13:
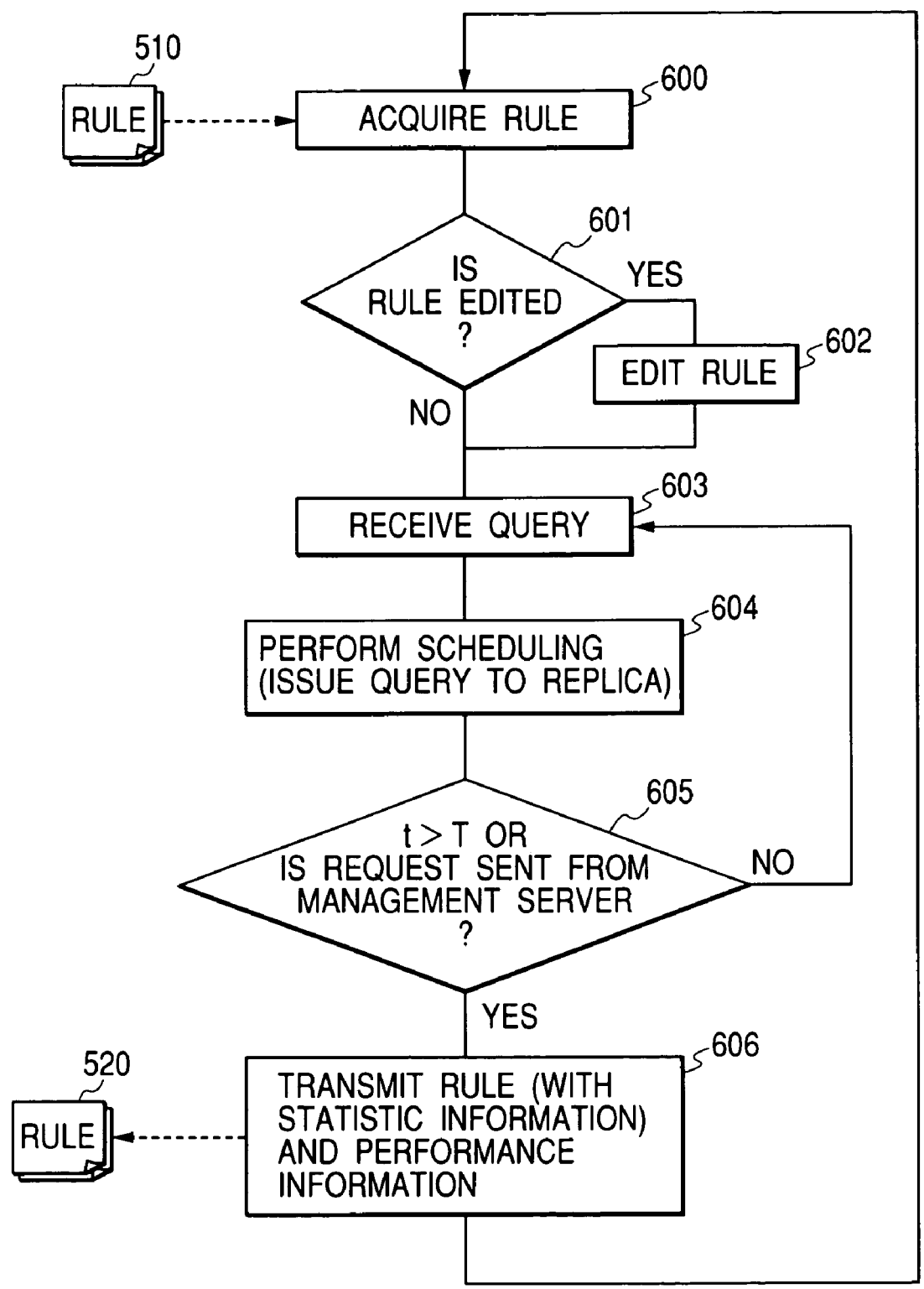
FIG. 13 is a flowchart describing actions to be performed by a front-end 102 included in the first embodiment of the present invention.

FIG. 13 is a flowchart describing actions to be performed by the front-end 102 included in the first embodiment of the present invention.

The front-end 102 schedules a query according to a received rule. First, the front-end 102 receives a rule 510 (rule list 1 and rule list 2) from the management server 105 (step 600).

It is verified whether the rule should be edited (step 601). If the rule should be edited, editing is performed (step 602). Since a rule is described in a simple if-then form, a human being (manager) can easily understand the rule. For example, assuming that a rule that a certain query must be processed by a specific server and that has priority is already known, the rule can be added. Moreover, an unnecessary rule may be deleted or a compatibility value may be edited so that a specific rule will be given priority.

When a query is received from the client 100 (step 603), scheduling is performed (step 604). The query is then posed to the replica 104. At this time, a frequency by which the rule has been applied is recorded in the frequency field 1913 or 1933 (see FIG. 10) associated with each rule in the rule list. It is then verified whether a certain time has elapsed or a request issued from the management server 105 is detected (step 605). Scheduling (step 604) is repeated until the condition of step 605 is met.

A rule list 520 (the rule and the rule application frequency) is transmitted to the management server at the timing at which the condition of step 605 is met.

Figure 14:
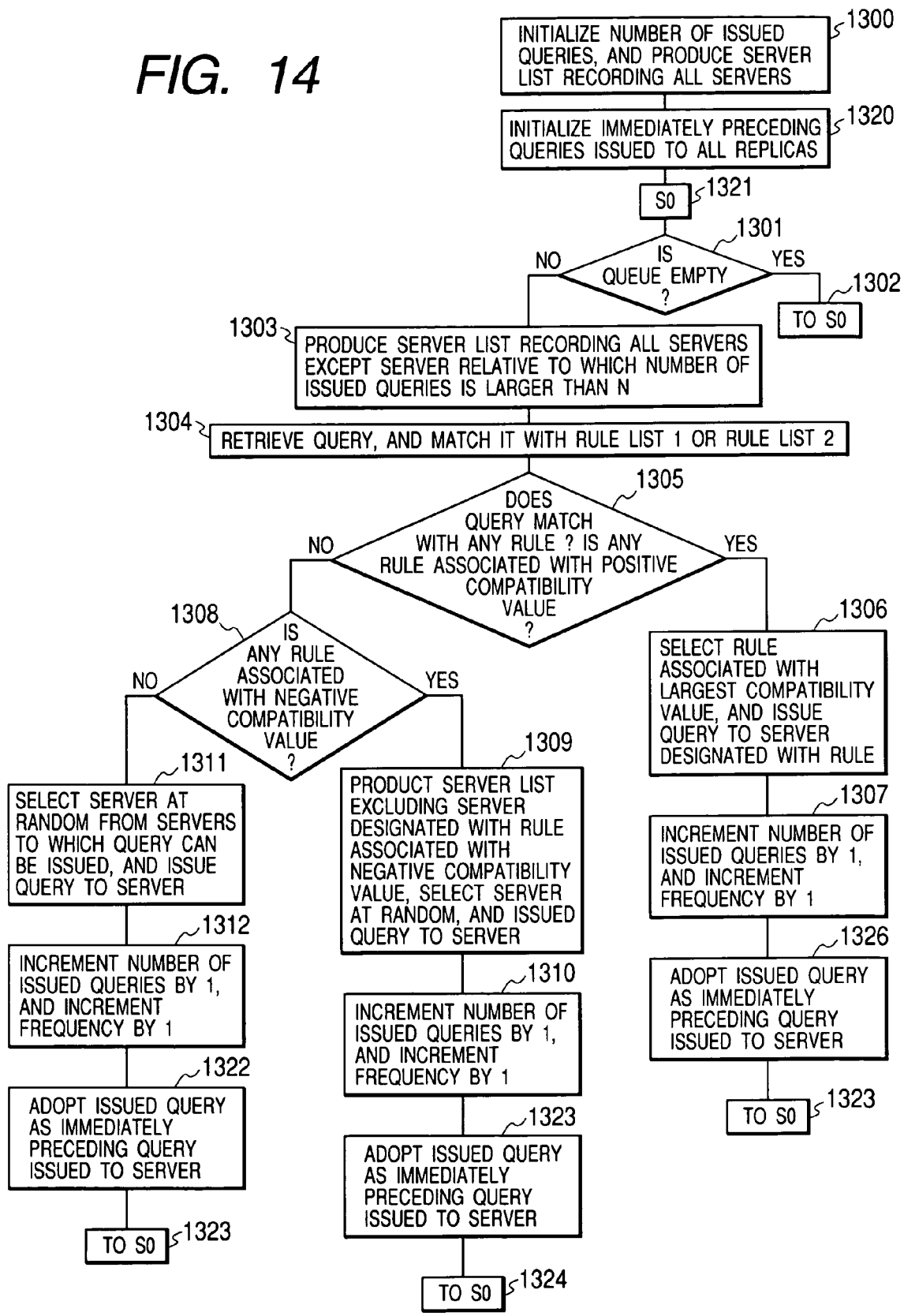
FIG. 14 is a flowchart describing scheduling (step 604) to be performed according to the first embodiment of the present invention.

FIG. 14 is a flowchart describing scheduling (step 604) to be performed in the first embodiment of the present invention.

The "number of posed queries" is adopted as a variable representing the number of queries processed by each replica. The number of queries posed to each replica 104 is recorded, and control is extended for fear the number of posed queries may exceed a predetermined threshold. This is intended to prevent queries from being concentrated on or posed to a specific replica 104.

Moreover, a "server list" is adopted as a list of replicas to which queries can be posed. If the number of posed queries relevant to a certain replica 104 exceeds the threshold, the replica name is deleted from the server list so that the server will not be selected thereafter.

Furthermore, an "immediately preceding query" is adopted as a variable representing a query processed immediately previously by each replica.

During scheduling, initialization is performed first. The number of posed queries relevant to each replica is initialized to 0, and a server list containing all replicas is produced (step 1300). The "immediately preceding queries" relevant to all replicas are initialized to blank spaces (step 1320).

Thereafter, it is verified whether the queue is left blank (step 1301). If the queue is left blank, control is returned to step 1301. A standby state remains until the queue is not left blank any longer. On the other hand, if the queue is not left blank, all servers are added to the server list. Thereafter, the number of posed queries relevant to each replica is verified. If the number of posed queries relevant to a certain replica exceeds a predetermined threshold (N), it means that queries are concentrated on or posed to the replica. The replica name is therefore deleted from the server list (step 1303).

A query is extracted from the queue, and matched with rules listed in the rule list 1 and rule list 2 (step 1304). For example, assuming that the extracted query is a query Qi, the query is matched with rules recorded in the form of {Qi,*} (where * denotes any name).

When an attempt is made to match the query with rules listed in the rule list 2, the query is matched with rules each stipulating a replica name (Sj) as *. Thus, rules stipulating replica names that are compatible or incompatible with the query Qi are extracted.

When an attempt is made to match the query with rules listed in the rule list 1, matching must be performed relative to all replicas to which the query can be posed. First, the "immediately preceding query" variable is checked in order to learn a query (Qj) immediately previously posed to a certain replica (R1). The rule list 1 relevant to the replica (R1) is searched for a rule stipulating {Qi,Qj}. If the rule stipulating {Qi,Qj} is found and a compatibility value stipulated in the rule is positive, it means that queries Qi and Qj are compatible with each other. The query Qi should therefore be posed to the replica (R1). If no query has ever been processed by a certain replica and there is no immediately processed query, matching using the rule list 1 is not performed.

Thereafter, it is verified whether the query is stipulated in rules stipulating a positive compatibility value (step 1305). If rules stipulating a positive compatibility value are found, control is passed to step 1306. If any rule stipulating a positive compatibility value is unfound, control is passed to step 1308.

If rules stipulating a positive compatibility value are found at step 1305, one of the rules is selected and the query is posed to a replica stipulated in the rule. For the selection, a rule stipulating the largest compatibility value is selected (step 1306). Incidentally, instead of the rule stipulating the largest compatibility value, a rule may be selected from among the selected rules in terms of probability. Thus, a replica to which the query is posed may be determined.

The number of posed queries relevant to the replica to which the query is posed is updated (incremented by one) and the frequency by which the rule has been applied is updated (incremented by one) (step 1307). The query stipulated in the rule is designated as the "immediately preceding query" relevant to the replica (step 1326), and control is returned to step 1301.

On the other hand, if any rule stipulating a positive compatibility value is unfound at step 1305, it is verified whether a rule stipulating a negative compatibility value is found (condition 1308). If a rule stipulating a negative compatibility value is found, control is passed to step 1309. If a rule stipulating a negative compatibility value is unfound, control is passed to step 1311.

If a rule stipulating a negative compatibility value is found at step 1308, the name of a replica stipulated in the rule that also stipulates a negative compatibility value is deleted from the server list. A replica is then selected from the server list in terms of probability (at random), and the query is posed to the replica (step 1309). Thereafter, the number of posed queries relevant to the replica is updated (incremented by one), and the frequency by which the rule has been applied is updated (incremented by one) (step 1310). The query stipulated in the rule is designated as the "immediately preceding query" relevant to the replica (step 1323), and control is returned to the step of verifying whether the condition 1301 is met.

On the other hand, if a rule stipulating a negative compatibility value is unfound at step 1308, a server is selected from the server list in terms of probability (at random), and the query is posed to the server. Thereafter, the number of posed queries relevant to the server is updated (incremented by one), and the frequency by which the rule has been applied is updated (incremented by one) (step 1312). The query stipulated in the rule is designated as the "immediately preceding query" relevant to the replica (step 1322), and control is returned to the step of verifying whether the condition 1301 is met.

As mentioned above, according to the first embodiment, the database system comprises the plurality of replicas 104 that processes a query, and the front-end 102 that allocates and poses queries to the replicas 104. The front-end 102 has the queue 131 and scheduler 130. The front-end 102 judges the compatibility between queries or between a query and a replica 104. The scheduler 130 combines a query with a compatible query or replica. The query is then posed to the replica 104. The scheduler 130 acts based on a rule and schedules a query so that contention for resources can be avoided. Consequently, contention for resources is avoided and the performance (throughput) of the database system is improved.

Moreover, the management server 105 acquires a processed query log that lists queries processed by a replica 104, and statistically analyzes the acquired processed query log. The management server 105 then calculates the compatibility value between queries or between a query and a replica. A rule is produced based on the calculated compatibility value and transmitted to the front-end 102. Since a rule is calculated using a processed query log, even if a system configuration or the contents or frequency of a query is changed, the management server can autonomously learn the change. Thus, the database system can be operated at a low cost.

Moreover, a compatibility value is treated in a manner understandable by a human being in order to produce a rule. It is therefore possible to edit, add, or delete a rule. A human being's intention can be reflected in autonomous learning.

Next, a second embodiment of the present invention will be described. According to the second embodiment, in addition to the compatibility between queries or between a query and a server that is employed in the first embodiment, the compatibility between users may be used for verification. In this case, in addition to the inter-query compatibility matrix 800, an inter-user compatibility matrix 2100 is employed.

FIG. 15 is an explanatory diagram showing an inter-user compatibility matrix employed in compatibility calculation according to the second embodiment of the present invention.

In the compatibility matrix 2100, Cij (2103) denotes the sum of processing times required to process any query, which a user Ui (2101) has issued, concurrently with a query issued by a user Uj (2102), and thus serves as the compatibility value between the user i (Ui: 2101) and user j (Uj: 2102). Moreover, Ai (2104) denotes the sum of processing times required to process all queries issued by the user Ui (2101) irrespective of the user Uj.

A call matrix 2110 indicates how many queries are used to calculate a compatibility value. For example, Tij (2113) denotes how many queries are used to calculate the Cij value (2103). In other words, Tij denotes a frequency by which a query issued by the user Ui (2101) is processed concurrently with a query issued by the user Uj (2102) and which is inferred from the log. Ti (2114) denotes the number of queries used to calculate the Ai (2104) value (a frequency by which the user Ui (2101) has issued a query).

The compatibility value between users is calculated in the same manner as the compatibility value between queries is. A rule is the produced and preserved in a rule list 3 (2130). In the rule list 3, each rule comprises a condition 2131 indicating a pair of users, a compatibility value 2131, and a frequency 2134.

Figure 16:
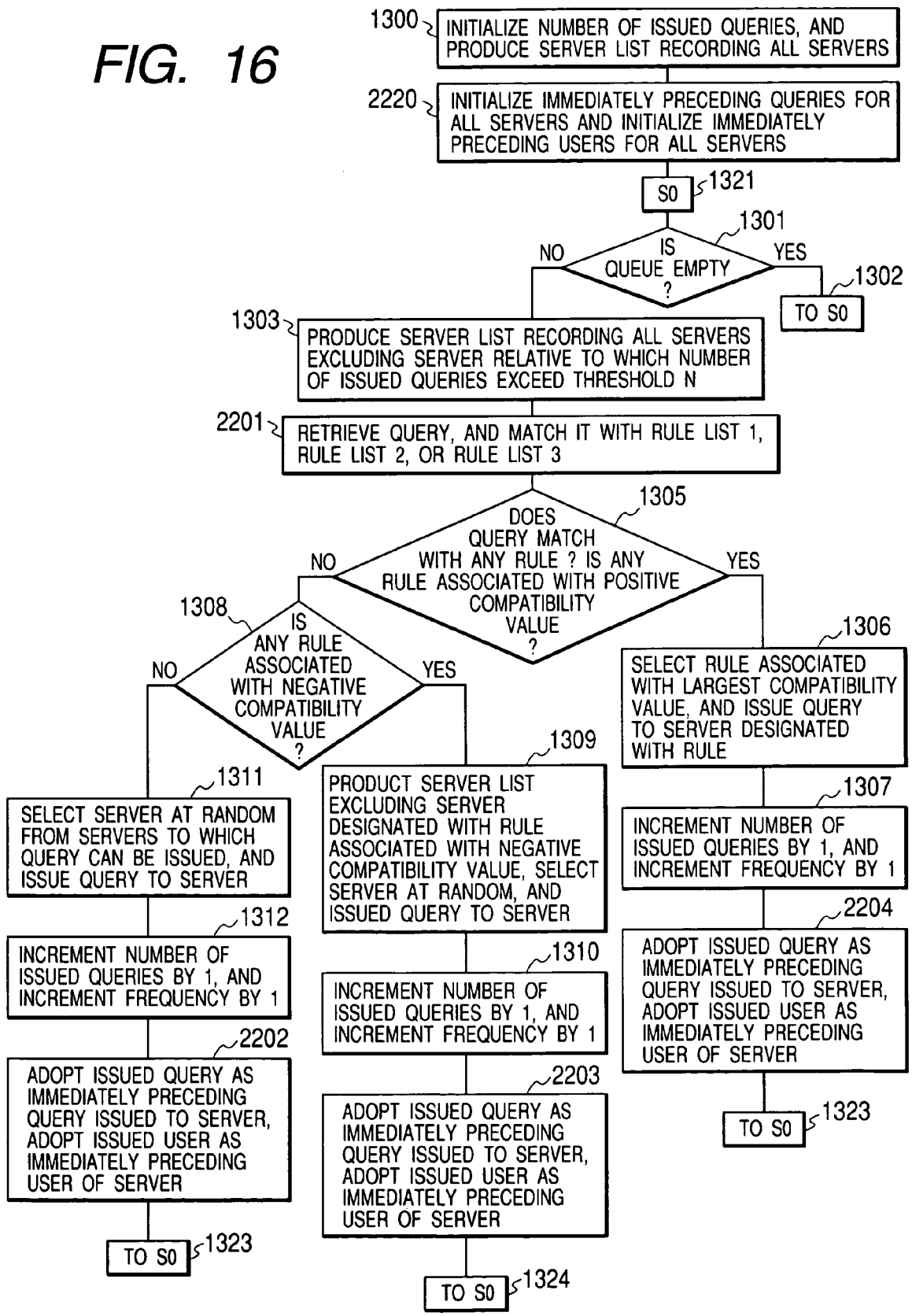
FIG. 16 is a flowchart describing scheduling (step 604) to be performed according to the second embodiment of the present invention.

FIG. 16 is a flowchart describing scheduling (step 704) to be performed in consideration of the compatibility between users according to the second embodiment of the present invention. The scheduling described in FIG. 16 is different from the scheduling described in FIG. 14 in steps 2200, 2201, 2202, 2203, and 2204.

The "number of posed queries" is adopted as a variable representing the number of queries processed by each replica. A "server list" is adopted as a list of replicas to which a query can be posed. An "immediately preceding query" is adopted as a variable representing a query immediately previously processed by each replica. Furthermore, an "immediately preceding user" is adopted as a variable representing a user who has issued the query.

During scheduling, first, initialization is performed. The number of posed queries relevant to each replica is initialized to 0, and the server list listing all replicas is created (step 1300). The "immediately preceding queries" and "immediately preceding users" relevant to each replica are initialized to blank spaces (step 2200).

Thereafter, it is verified whether the queue is left blank (step 1301). If the queue is left blank, control is returned to step 1301. A standby state remains until the queue is no longer left blank. On the other hand, if the queue is not left blank, the server list lists all servers. The number of posed queries is verified for each replica. If the number of posed queries exceeds a predetermined threshold (N), it means that queries are concentrated on and posed to the replica. The replica name is therefore deleted from the server list (step 1303).

A query is then extracted from the queue and matched with rules listed in the rule list 1 and rule list 2 (step 1304). For example, a query extracted from the queue is matched with rules on the basis of a user (Ui) who has issued the query. During the matching, the rule list 3 relevant to each replica is searched for a rule that stipulates {Ui, "immediately preceding user"} in the condition field. In other words, it is verified if any user issues a query that is compatible with the query issued by the user (Ui) or if any user issues a query that is incompatible therewith.

Thereafter, it is verified whether the query is stipulated in any rule that stipulates a positive compatibility value (step 1305). If rules stipulating a positive compatibility value are found, control is passed to step 1306. If the rules stipulating a positive compatibility value are unfound, control is passed to step 1308.

If rules stipulating a positive compatibility value are found at step 1305, a rule is selected from among the rules. The query is then posed to a replica stipulated in the rule. For the selection, a rule stipulating a maximum compatibility value is selected (step 1306). Instead of the rule stipulating a maximum compatibility value, a rule may be selected from among the selected rules in terms of probability. A replica to which the query is posed may thus be determined.

The number of posed queries relevant to the replica to which the query is posed is updated (incremented by one), and the frequency by which the rule has been applied is updated (incremented by one) (step 1307). The query stipulated in the rule is designated as the "immediately preceding query" relevant to the replica, and the user who has issued the query is designated as the "immediately preceding user" (step 2204) Control is then returned to step 1301.

On the other hand, if any rule stipulating a positive compatibility value is unfound at step 1305, it is verified whether a rule stipulating a negative compatibility value is found (condition 1308). If the rule stipulating a negative compatibility value is found, control is passed to step 1309. If the rule stipulating a negative compatibility value is unfound, control is passed to step 1311.

If the rule stipulating a negative compatibility value is found at step 1308, the name of a replica stipulated in the rule is deleted from the server list that lists replicas. A replica is selected from the resultant server list in terms of probability (at random), and the query is posed to the replica (step 1309). Thereafter, the number of posed queries relevant to the replica to which the query is posed is updated (incremented by one), and the frequency at which the rule has been applied is updated (incremented by one) (step 1310). The query stipulated in the rule is designated as the "immediately preceding query" relevant to the replica, and the user who has issued the query is designated as the "immediately preceding user" (step 2203). Control is then returned to step 1301.

On the other hand, if any rule stipulating a negative compatibility value is unfound at step 1308, a server is selected from the server list in terms of probability (at random). The query is posed to the server. Thereafter, the number of posed queries relevant to the replica to which the query is posed is updated (incremented by one), and the frequency at which the rule has been applied is updated (incremented by one) (step 1312). The query stipulated in the rule is designated as the "immediately preceding query" relevant to the replica, and the user who has issued the query is designated as the "immediately preceding user" (step 2202). Control is then returned to step 1301.

As mentioned above, according to the second embodiment, the database system comprises the plurality of replicas 104 that processes a query, and the front-end 102 that allocates and poses queries to the replicas 104. The front-end 102 has the queue 131 and scheduler 130. The front-end 102 judges the compatibility between users who issue a query or between a user who issue a query and a replica 104. The scheduler 130 mates a user with a compatible user or compatible replica, and poses a query to the replica 104. The scheduler 130 acts based on a rule and schedules a query so that contention for resources can be avoided. Consequently, contention for resources is avoided, and the performance (throughput) of the database system is improved.

Next, a third embodiment of the present invention will be described below. According to the third embodiment, an external server is connected to a management server over a network so that the external server can access the management server. Consequently, a database system can be externally monitored and managed.

Figure 17:
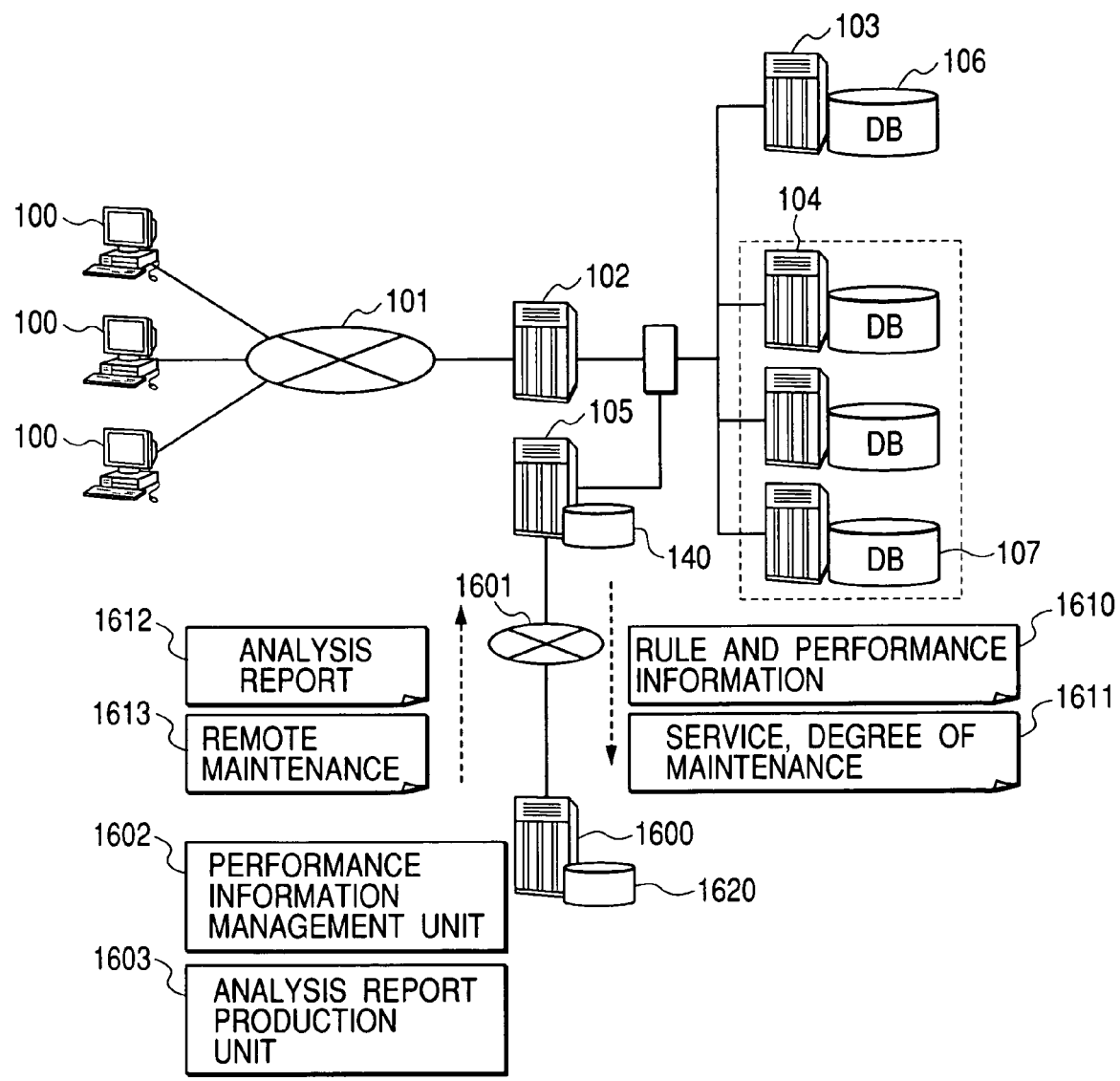
FIG. 17 shows the configuration of a database system in accordance with a third embodiment of the present invention.

FIG. 17 shows the configuration of a database system in accordance with the third embodiment of the present invention.

A management server 105 is connected on a network 1601 (intranet or Internet). The management server 105 is connected to a monitor/analysis server 1600 installed in a management service provider (MSP), which contracts to manage a database system, over the network 1601. Rule data and performance data are recorded in a rule database 140 included in the management server 105. The monitor/analysis server 1600 analysis the data, whereby the maintenance and diagnosis of the database system can be achieved externally and remotely.

The monitor/analysis server 1600 comprises a performance information management unit 1602 and an analysis report production unit 1602. The performance information management unit 1602 acquires a rule, a rule application frequency, a resource use rate relevant to each replica, or the like as rule/performance information 1610 from the management server 105. The acquired rule/performance information 1610 is stored in a rule/performance information database 1620. In the rule/performance information database 1620, information is managed time-sequentially. The analysis report production unit 1603 produces an analysis report 1612 on the basis of performance information.

Moreover, the monitor/analysis server 1600 performs remote maintenance 1613 on the management server 105.

The proprietor or organizer of an information system pays as a charge for monitor and analysis a service fee or a maintenance fee 1611 to the MSP. The proprietor or organizer of an information system can consign database management (or part of database management) to an outside firm.

Figure 18:
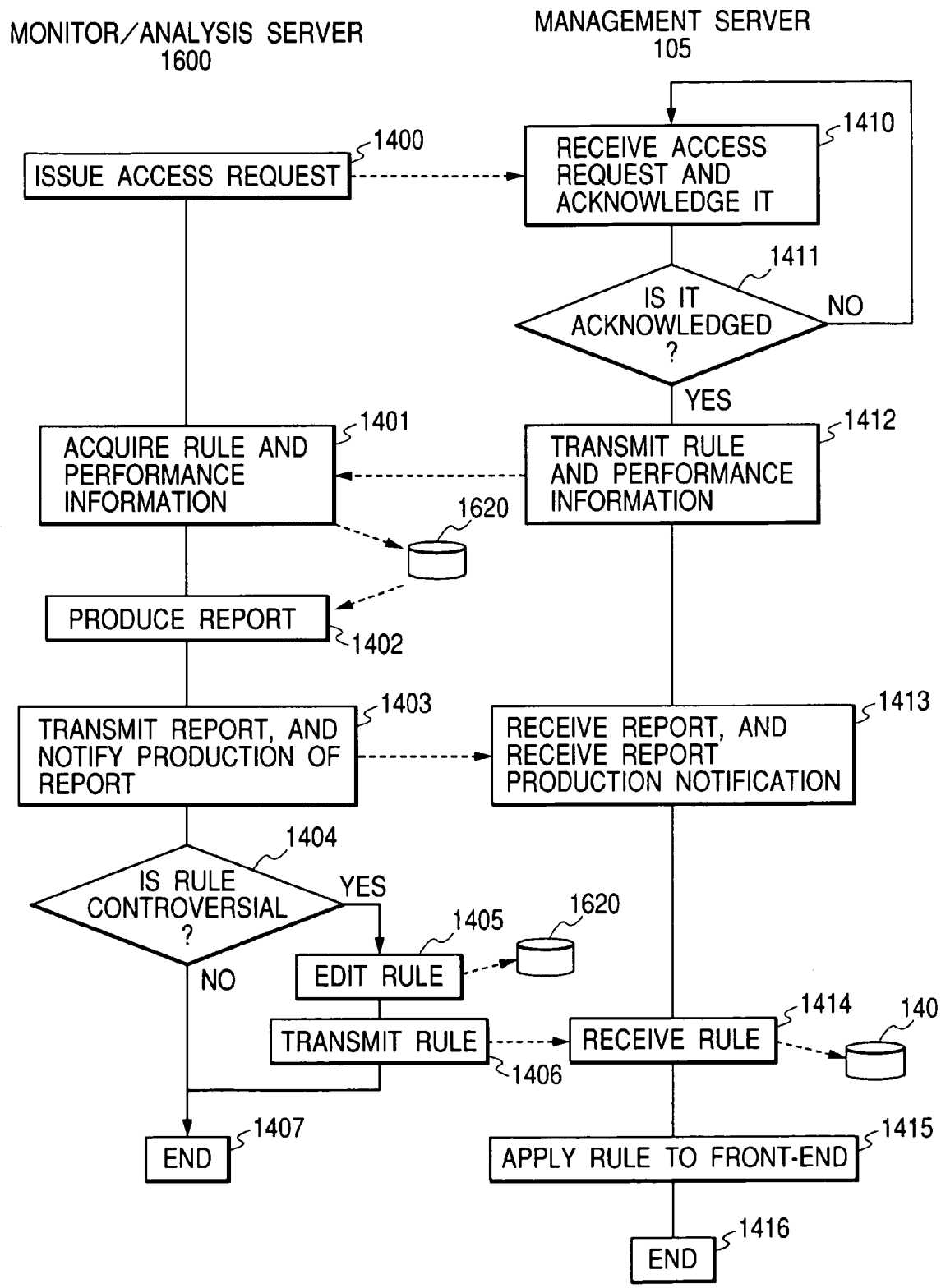
FIG. 18 is a flowchart describing actions to be performed by a monitor/analysis server 1600 and a management server 105 included in the third embodiment of the present invention.

FIG. 18 is a flowchart describing actions to be performed by the monitor/analysis server 1600 and management server 105 included in the third embodiment of the present invention. The left side of the flowchart describes the actions to be performed by the monitor/analysis server 1600 and the right side thereof describes the actions to be performed by the management server 105.

The monitor/analysis server 1600 transmits an access request to the management server 105 (step 1400).

The management server 105 receives the access request from the monitor/analysis server 1600, and acknowledges the access request (step 1410). If the access request is acknowledged (step 1411), rule/performance information recorded in the rule database 140 is transmitted (step 1412).

The monitor/analysis server 1600 whose request (1400) has been acknowledged acquires rule/performance information 1610 (step 1401). The acquired rule/performance information 1610 is recorded in the rule/performance information database 1620.

Performance information recorded in the rule/performance information database 1620 is time-sequentially analyzed according to a method to be described later, whereby an analysis report is produced (step 1402). Finally, the produced analysis report is transmitted by mail (step 1403). Incidentally, the monitor/analysis server 1600 (or management server 105) may store the produced analysis report in a Web server (not shown) accessible over the network, and may notify the management server 105 of the fact that the analysis report has been created.

The management server 105 receives the analysis report (step 1413).

Thereafter, the monitor/analysis server 1600 verifies whether any rule is controversial (for example, a specific controversial rule may bring about a decrease in throughput) (step 1404). The monitor/analysis server 1600 edits a controversial rule (step 1405). For example, a controversial rule may be deleted or the compatibility value stipulated in the rule may be changed. Thus, the application of the rule is controlled in order to improve the throughput of the system. The edited rule is transmitted to the management server 105 (step 1406). Thus, rules are maintained.

The management server 105 receives a rule from the monitor/analysis server 1600 and records it in the rule database 140 (step 1414). The management server 105 then transmits the rule to the front-end 102 (step 1415), and directs scheduling based on the new rule.

Figure 19:
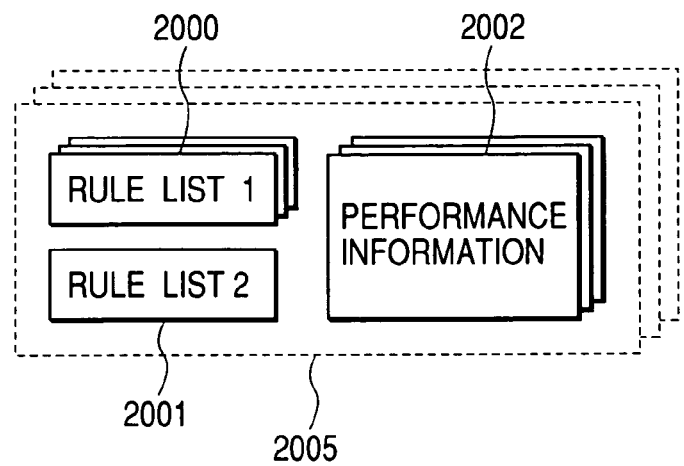
FIG. 19 is an explanatory diagram showing a data file which the monitor/analysis server 1600 included in the third embodiment of the present invention manages using a performance information database 1620.

FIG. 19 is an explanatory diagram showing a data file which the monitor/analysis server 1600 included in the third embodiment of the present invention manages using the performance information database 1620.

The data file 2005 contains rule lists 2000 and 2001 and performance information items 2002. The rule lists include the rule lists 1 (2000) and the rule list 2 (2001). The number of rule lists 1 (2000) and the number of performance information items (2002) are the same as the number of replicas 104.

Moreover, the data file 2005 is newly produced every time a rule is changed, and managed as time-sequential data.

Figure 20:
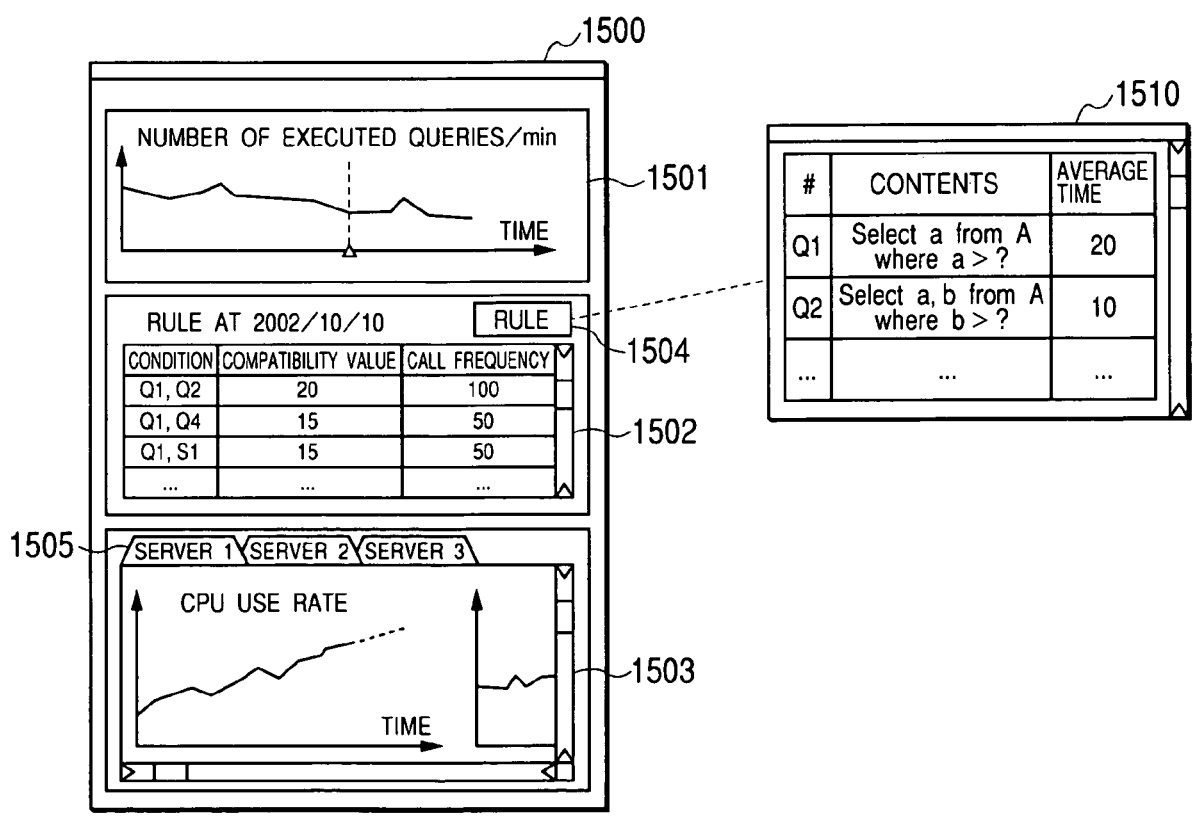
FIG. 20 is an explanatory diagram showing an example of a display screen image of an analysis report employed according to the third embodiment of the present invention.

FIG. 20 is an explanatory diagram showing an example of a display screen image of an analysis report employed according to the third embodiment of the present invention.

As the analysis report 1500, a throughput indicator 1501, a rule indicator 1502, and a performance indicator 1503 are displayed.

As the throughput indicator 1501, a graph indicating the performance of the database system is displayed. For example, the number of queries processed per unit time is graphically displayed. The throughput indicator 1501 helps grasp a time-sequential change in the performance of the database system. Moreover, a future throughput may be extrapolated from the graph.

As the rule indicator 1502, information concerning rules that are scheduled by the front-end at a certain time instant is displayed. A user may directly enter a period (time) during which rules to be analyzed are produced or may designate it through a throughput screen image 1501. As the rule indicator 1502, rules are listed in relation to a condition, a compatibility value, and an application frequency. Identifiers (iDs) assigned to queries are presented in order to stipulate the condition in each rule listed in the rule indicator 1502, but the contents of queries are not. Therefore, a rule detail indicator 1510 is separately included in order to present the contents of queries. The rule indicator 1504 helps grasp what rules have been produced and applied how many times.

Moreover, a time-sequential change in an applied rule can be learned. For example, a rule is learned and changed. Therefore, if the throughput of the system has decreased, a cause of the decrease in the throughput can be found out by checking if any rule has changed. If a specific rule is controversial, the rule is edited for maintenance. For example, the rule may be deleted or the compatibility value stipulated in the rule may be changed. Thus, the application of the rule is controlled in order to improve the throughput.

A performance screen image 1503 is a graph indicating information concerning a performance resource, such as, a CPU use rate or a disk use rate relevant to each replica. The performance screen image helps grasp a load imposed on each replica or a balance of loads imposed on replicas. If a fault in each replica is identified, investment in equipment can be proposed in order to avoid occurrence of the fault. For example, if a memory use rate is high, addition of a memory can be proposed.

Figure 21:
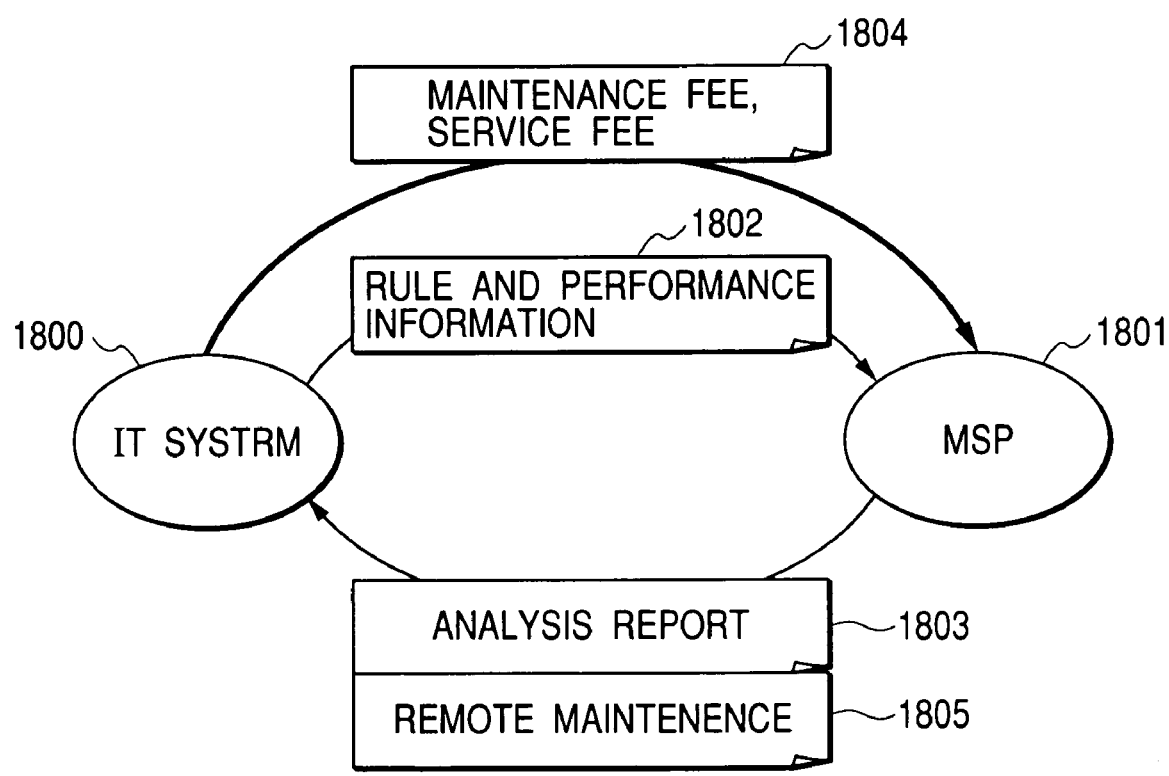
FIG. 21 schematically shows a business model of a monitor/management service.
Figure 22:
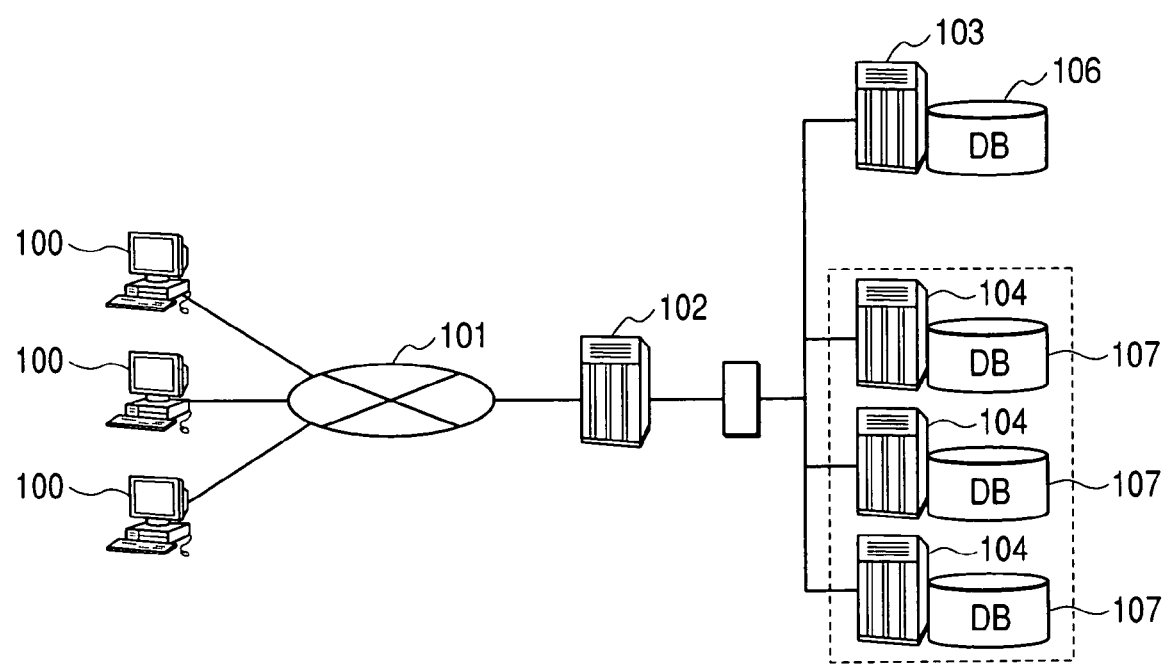
FIG. 22 shows the configuration of a conventional database system.
Figure 23:
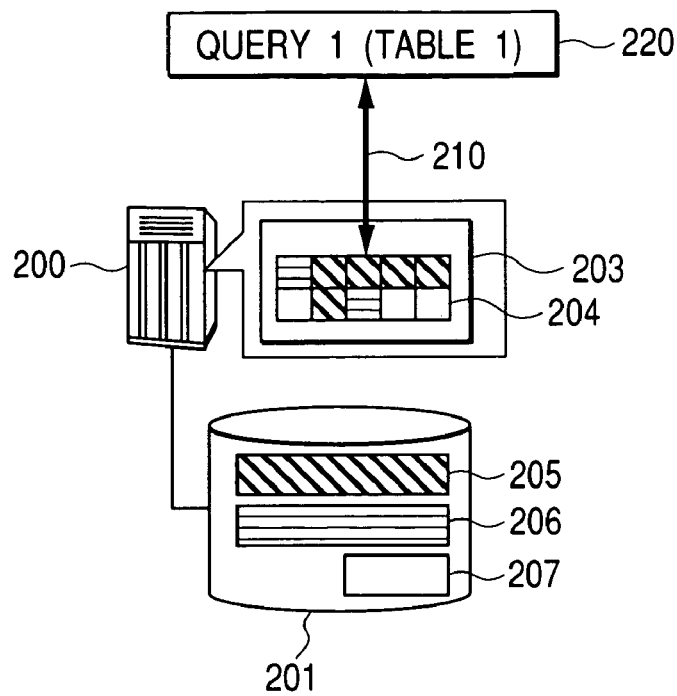
FIG. 23 is an explanatory diagram showing an action involving a database buffer included in the conventional database system.
Figure 24A:
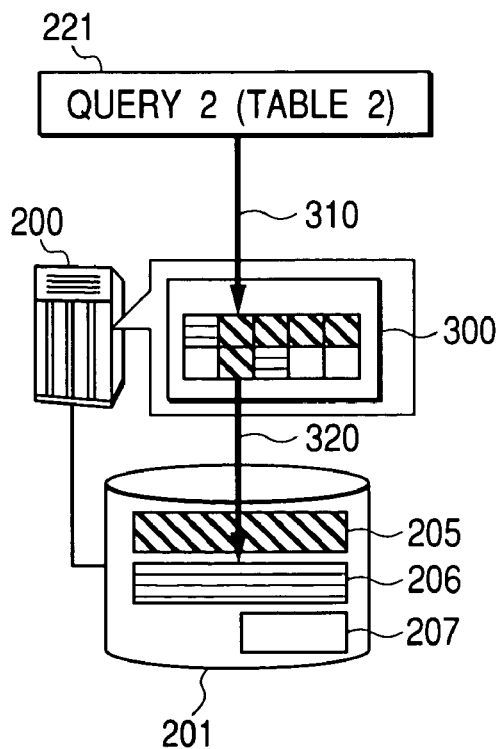
FIG. 24A and FIG. 24B are explanatory diagrams showing actions involving a database buffer included in the conventional database system.
Figure 24B:
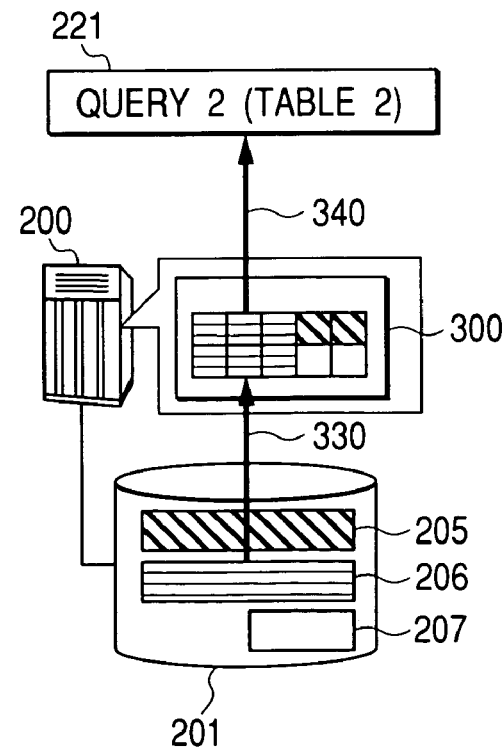

FIG. 21 is an explanatory diagram schematically showing a business model for provision of a monitor/management service in which the third embodiment is implemented.

A manager or proprietor of an IT system 1800 such as a database system (for example, the one shown in FIG. 1) contracts an external MSP 1801 for outsourcing of management.

The IT system 1800 transmits rule/performance information 1802 to the MSP 1801. The rule/performance information 1802 contains, in addition to performance information such as a resource use rate relevant to each server, rules autonomously produced by the IT system 1800.

The MSP 1801 not only monitors and analyses performance information such as a resource use rate as it conventionally does but also monitors and analyzes rules. The MSP 1801 receives and analyzes the rule/performance information 1802, composes a report 1803 from the results of analysis, and provides the IT system 1800 with the report. Moreover, the MSP 1801 performs remote maintenance 1805. Specifically, not only parameters representing the settings of software are changed as conventionally but also a rule is edited. A rule is composed of a plurality of data items written in an abstract format (for example, in an if-then format). Since the rule is highly readable, it can be easily understood by a human being. A manager of the MSP 1801 can therefore edit a rule.

Moreover, the MSP 1801 can propose a change in hardware of a replica 104 through diagnosis. Since the rule/performance information 1802 is managed time-sequentially, a change in a database system can be grasped. Consequently, measures can be taken prior to occurrence of a fault in performance.

A manager or proprietor of the IT system 1800 pays a charge for maintenance or provision of a service to the MSP 1801.

More particularly, the MSP 1801 periodically produces the analysis report 1803. The manager or proprietor of the IT system that is a user pays a support/maintenance fee as a charge for the production of the analysis report to the MSP 1801.

As described so far, according to the third embodiment, the external monitor/analysis server 1600 monitors and manages the management server 105. Therefore, the behavior of a database system can be easily grasped using rules written in an abstract format. Moreover, a rule can be easily changed. A service with a high value added thereto can be provided.

What is claimed is:

1. A database system comprising:
   a plurality of database servers each of which includes a database from which the same content can be searched and retrieved in response to a query;
   a front-end server that receives said query from a client terminal, and that poses said query to any of said database servers according to at least one predetermined rule;
   a management server that manages said rule with a rule management unit to be used by said front-end server wherein said servers and client terminals that issue a query are interconnected; and
   said management server further comprising:
   a log acquisition unit for acquiring a processed query log relevant to each database server;
   and a rule production unit for producing said rule according to a compatibility value of a query calculated using the acquired query log in a compatibility calculation unit; and
   said front-end server further comprising a query posing unit that uses the rule produced by said management server to pose the query.

2. A management server comprising:
   a log acquiring unit for acquiring a processed query log relevant to each of a plurality of database servers;
   a rule production unit for producing a rule according to the compatibility value of a query calculated using the acquired processed query log; and
   a rule transmitting unit for transmitting the produced rule to said front-end server so that said front-end server can pose the query according to the produced rule wherein:
   the management server is structured to manage the rules to be used by said front-end server which poses the query to at least one of said plurality of database servers and wherein;
   each of said database servers includes a searchable database from which the same content can be retrieved, in response to said query according to said rule.

3. A management server according to claim 2, wherein said rule production unit statistically processes a processed query listed in the acquired processed query log, and calculates the compatibility value of the processed query so as to produce a rule.

4. A management server according to claim 3, wherein:
   said rule production unit groups said processed queries listed in said processed query log into at least one group sorted by at least one shared criteria of the processed queries relevant to each database server; and
   based on a result of a comparison between a first average of all processing times required for said processed queries classified into said group and a second average of processing times required to process a selected processed query classified into said group while maintaining a predetermined temporal relationship with another selected processed query classified into a second group, said rule production unit calculates the compatibility value between the queries to produce a rule.

5. A management server according to claim 2, wherein based on a result of a comparison between a first processing time required for a first processed query listed in a first processed query log stored in a database and a second processing time required for a second processed query listed in a second processed query log stored in another database, said rule production unit calculates the compatibility value between the queries and the databases to produce a rule.

6. A management server according to claim 2, wherein based on a result of a comparison between an average of processing times required to process a first query issued by a first user and an average of processing times required to process the first query issued by the first user while maintaining a predetermined temporal relationship with a second query issued by a second user, said rule production unit calculates the compatibility value between the first and second queries of the first and second users, so as to produce a rule.

7. A management server according to claim 2, further comprising a rule changing unit for changing a rule produced by said rule production unit.

8. A management server according to claim 7, further comprising an external access unit for permitting external access over a network, wherein said rule changing unit changes a rule via said external access unit.

9. A management server according to claim 2, wherein:
   said log acquiring unit acquires the processed query log listing a query posed based on the rule transmitted by said rule transmitting unit; and
   said rule production unit produces a second rule according to the compatibility value of the query, wherein the second rule is calculated using the acquired processed query log and thus the management server autonomously creates a new rule.

10. A query posing method implemented in a database system comprising a plurality of database servers each of which includes a database from which the same content can be retrieved and which searches the database in response to a query request;

a front-end server that receives the query request and poses a query to at least one of said database servers according to a predetermined rule method wherein the rule method comprises:

acquiring in a management server a processed query log relevant to said database servers, calculating a query compatibility value in said management server by using said processed query log;

producing a rule according to said compatibility value; and controlling said front end server by said management server wherein said front-end server uses the rule produced by said management server to selectively pose said query to a selected most compatible database server from said database servers according to said rule.

11. A query posing method according to claim 10, further comprising:

statistically processing said acquired processed query log and said query in order to calculate said compatibility value of said query when producing said rule.

12. A query posing method according to claim 11, wherein:

before the calculating step;

grouping queries listed in said processed query log relevant to each of said database servers; and comparing based on the result of a comparison between a first average of processing times required for a first query classified into a group and a second average of processing times required to process said first query classified into the group while maintaining a predetermined temporal relationship with a second query classified into a second group, and then calculating the compatibility value between the queries.

13. A query posing method according to claim 10, further comprising:

statistically processing a query listed in said processed query log in order to calculate the compatibility value between the query and said database servers so as to produce a rule.

14. A query posing method according to claim 10, further comprising:

statistically processing a query listed in said processed query log in order to calculate the compatibility value between users, who issue a query, so as to produce a rule.

15. A query posing method according to claim 10, further comprising:

excluding, if said selected most compatible database server compatible with said query is not found, an incompatible database server incompatible with the query from said database servers to which the query can be posed, and selecting a database server to which the query is posed in terms of probability of compatibility with said query.

16. A query posing method according to claim 10, further comprising;

when said selected most compatible database server is not found, determining a previously used database server that has immediately previously processed a query compatible with the query is selected, and posing the query to the previously used database server.

17. A query posing method according to claim 10, further comprising:

producing said rule based on the compatibility value of the query calculated using the acquired log, and wherein previously transmitted rules are reviewed and a new rule is autonomously produced based on the performance of past rules.

\* \* \* \* \*